US007109480B2

(12) United States Patent
Vestal et al.

(10) Patent No.: US 7,109,480 B2

(45) Date of Patent: Sep. 19, 2006

(54) ION SOURCE AND METHODS FOR MALDI MASS SPECTROMETRY

(75) Inventors: Marvin L. Vestal, Framingham, MA (US); Kevin M. Hayden, Newton, NH (US); Philip J. Savickas, Franklin, MA (US)

(73) Assignees: Applera Corporation, Framingham, MA (US); MDS Inc., Ontario (CA)

(*) Notice: Subject to any disclaimer, the term of this patent is extended or adjusted under 35 U.S.C. 154(b) by 0 days.

(21) Appl. No.: 11/065,341

(22) Filed: Feb. 23, 2005

(65) Prior Publication Data

US 2005/0194544 A1 Sep. 8, 2005

Related U.S. Application Data

(63) Continuation of application No. 10/700,300, filed on Oct. 31, 2003, now Pat. No. 6,953,928.

(51) Int. Cl.

*H01J 49/10* (2006.01)
*H01J 49/00* (2006.01)
*B01D 59/44* (2006.01)

(52) U.S. Cl. ...................... 250/288; 250/281; 250/282; 250/425; 315/111.81

(58) Field of Classification Search ................. 250/288
See application file for complete search history.

(56) References Cited

U.S. PATENT DOCUMENTS 5,498,545 A 3/1996 Vestal
5,625,184 A 4/1997 Vestal et al.
5,627,369 A 5/1997 Vestal et al.
5,821,063 A 10/1998 Patterson et al.
5,828,063 A 10/1998 Köster et al.
5,864,137 A 1/1999 Becker et al.
5,898,173 A * 4/1999 Franzen ...................... 250/287
5,955,731 A 9/1999 Bergmann et al.
6,002,127 A 12/1999 Vestal et al.
6,057,543 A 5/2000 Vestal et al.
6,281,493 B1 8/2001 Vestal et al.
RE37,485 E 12/2001 Vestal (Continued)

OTHER PUBLICATIONS

"High-Throughput STR Analysis by Time-of-Flight Mass Spectrometry," John M. Butler, Kathryn M. Stephens, Joseph A. Monforte, Christopher H. Becker, GeneTrace Systems Inc., 1401 Harbor Bay Parkway, Alameda, CA 94502, downloaded Aug. 2003 from www.promega.com.

(Continued)

*Primary Examiner*—Nikita Wells
(74) *Attorney, Agent, or Firm*—Lahive & Cockfield LLP

(57) ABSTRACT

Provided are MALDI ion sources, methods of forming ions and mass analyzer systems. In various embodiments, provided are MALDI ion sources configured to irradiate a sample on a sample surface with a pulse of laser energy at angle within 10 degrees or less of the surface normal, and a first ion optics system configured to extract sample ions in a direction within 5 degrees or less of the surface normal. In various embodiments, MALDI ion sources having substantially coaxial sample irradiation and ion extraction are provided. In various embodiments, methods are provided, which produce sample ions by MALDI and extract sample ions using an accelerating electrical field to form an ion beam, such that, the angle of the trajectory at the exit from the accelerating electrical field of sample ions substantially at the center of the ion beam is substantially independent of sample ion mass.

14 Claims, 17 Drawing Sheets

U.S. PATENT DOCUMENTS

| | | | | |
|---|---|---|---|---|
| 6,348,688 | B1 | 2/2002 | Vestal | |
| 6,441,369 | B1 | 8/2002 | Vestal et al. | |
| 6,444,980 | B1 * | 9/2002 | Kawato | 250/307 |
| 6,504,150 | B1 | 1/2003 | Verentchikov et al. | |
| 6,512,225 | B1 | 1/2003 | Vestal et al. | |
| 6,534,764 | B1 | 3/2003 | Verentchikov et al. | |
| 6,541,765 | B1 | 4/2003 | Vestal | |
| 6,545,268 | B1 | 4/2003 | Verentchikov et al. | |
| 6,707,039 | B1 * | 3/2004 | Truche et al. | 250/288 |
| 6,707,040 | B1 * | 3/2004 | Makarov et al. | 250/288 |

OTHER PUBLICATIONS

"STR Analysis by Time-of-Flight Mass Spectrometry" By John M. Butler, Ph.D. GeneTrace Systems Inc., 1401 Harbor Bay Parkway, Alameda, CA, downloaded Aug. 2003 from www.promega.com.

Written Opinion International Application No. PCT/US2004/031333, dated Jan. 18, 2006.

International Search Report Application No. PCT/US2004/031333, dated Jan. 18, 2006.

* cited by examiner

ION SOURCE AND METHODS FOR MALDI MASS SPECTROMETRY

CROSS-REFERENCE TO RELATED APPLICATIONS

The present application is a continuation of and claims the benefit of and priority to U.S. patent application Ser. No. 10/700,300, filed Oct. 31, 2003, now U.S. Pat. No. 6,953,928, issued Oct. 11, 2005, the entire disclosure of which is herein incorporated by reference.

BACKGROUND

The development of matrix-assisted laser desorption/ionization ("MALDI") and electrospray ionization ("ESI") techniques has greatly increased the range of biomolecules that can be studied with mass analyzers. MALDI and ESI techniques allow normally nonvolatile molecules to be ionized to produce intact molecular ions in a gas phase that are suitable for analysis.

Both MALDI and ESI techniques are, however, rather "dirty" techniques in that a relatively large amount of the nonvolatile material that is vaporized can be deposited on the electrodes of the ion source and mass analyzer. Material deposition is of particular concern in high-throughput applications such as proteomics studies that seek to operate mass analyzer systems on a "24/7" basis.

Material deposition can produce a variety of problems. Material deposited on electrodes can, for example, charge up and produce uncontrolled potentials and distorted potentials on the electrodes. Such uncontrolled and distorted potentials on electrodes in the ion beam path can significantly decrease both mass analyzer sensitivity and mass analyzer resolution. In addition, such material deposition increases mass analyzer downtime by increasing the frequency with which electrodes need to be cleaned. A need therefore exists for ion sources that reduce or eliminate material deposition on electrodes in the ion beam path.

In many biomolecule studies (such as, e.g., proteomics studies) that employ mass analyzers the biomolecule masses of interest can readily span two or more orders. An ongoing desire therefore exists for ion sources and mass analyzers systems that can provide increased dynamic mass range.

In addition, in many biological studies there is a limited amount of sample available for study (such as, e.g., rare proteins, forensic samples, archaeological samples). Accordingly, there is an ongoing desire for ion sources and mass analyzers systems that can provide increased sensitivity and resolution and can thus operate with ever decreasing amounts of sample.

SUMMARY

The present teachings relate to matrix-assisted laser desorption/ionization (MALDI) ion sources and methods of MALDI ion source operation, for use with mass analyzers. The MALDI ion sources can serve and be operated as pulsed MALDI ion sources. In various aspects, provided are ion sources, ion formation methods and mass analyzer systems that facilitate increasing one or more of sensitivity, resolution, dynamic mass range and facilitate decreasing operational downtime of a mass analyzer.

In various aspects, MALDI ion sources, methods of forming ions using a MALDI ion source and mass analyzer systems that reduce material deposition on electrodes in the ion beam path are provided. Reducing material deposition on electrodes in the ion beam path can facilitate, for example, increased mass analyzer sensitivity, resolution, or both, and facilitate decreasing the operational downtime of a mass analyzer.

In various aspects, MALDI ion sources, methods of ion formation using a MALDI ion source and mass analyzers systems that provide an ion beam where the trajectory (at the exit of an ion source extraction region) of ions at the center of the ion beam is substantially independent of ion mass are provided. Such an ion mass independent trajectory can facilitate increasing the dynamic mass range of a mass analyzer.

In various aspects, MALDI ion sources, methods of ion formation using a MALDI ion source and mass analyzers systems that facilitate more efficient ion transmission to a mass analyzer are provided. More efficient ion transmission can provide, for example, improved signal for a given amount of sample; and thereby provide, for example, increased mass analyzer sensitivity, resolution, or both.

In one aspect, a MALDI ion source that includes an optical system configured to irradiate a sample on the sample surface of a sample holder with a pulse of laser energy at angle within 10 degrees or less of the normal of the sample surface of the sample holder, and a first ion optics system configured to extract sample ions in a direction substantially normal to the sample surface can be provided. In some embodiments, the sine of the angle the incident pulse of laser energy forms with the sample surface is less than about 0.10, and in some embodiments less than about 0.01. Accordingly, in various embodiments, the optical system is configured to irradiate the sample on the sample surface of the sample holder with the pulse of laser energy at angle within 5 degrees or less of the normal of the sample surface. In various embodiments, the optical system is configured to irradiate the sample on the sample surface of the sample holder with the pulse of laser energy at angle within 1 degree or less of the normal of the sample surface.

In various embodiments, the first ion optics system includes two electrodes, a first electrode and a second electrode, each having an aperture. The two electrodes are in some embodiments arranged such that a first ion optical axis (defined by the line between the center of the aperture in the first electrode and the center of the aperture in the second electrode) intersects the sample surface at an angle within 5 degrees or less of the normal of the sample surface. In some embodiments, the sine of the intersection angle the first ion optical axis with the sample surface is less than about 0.10, and in some embodiments less than about 0.01. Accordingly, in various embodiments, the first ion optical axis intersects the sample surface at an angle within 1 degree or less of the normal of the sample surface. In various embodiments, the optical system is configured to substantially align the pulse of laser energy with the first ion optical axis.

In one aspect, MALDI ion sources configured to irradiate a sample on a sample surface with a pulse of laser energy to form sample ions by matrix-assisted laser desorption/ionization and extract sample ions in an extraction direction substantially coaxial with the Poynting vector of the pulse of energy striking the sample are provided. In various embodiments, the extraction direction forms an angle that is between about 5 degrees and 50 degrees with respect to the normal of the sample surface.

In one aspect, a MALDI ion source that provides an ion beam where the angle of the trajectory (at the exit from an acceleration region of the ion source) of sample ions substantially at the center of the ion beam is substantially independent of sample ion mass can be provided. In various embodiments, the MALDI ion source includes an optical system configured to irradiate a sample on a sample surface of a sample holder with a pulse of laser energy at an irradiation angle to generate sample ions, and a first ion optics system configured to extract the sample ions in an extraction direction to form an ion beam. In these various embodiments, the irradiation angle and extraction direction are such that the angle of the trajectory at the exit from the first ion optics system of sample ions substantially at the center of the ion beam is substantially independent of sample ion mass. In some embodiments, the irradiation angle and extraction direction are substantially normal to the sample surface.

In one aspect, a MALDI ion source can be provided that includes an optical system configured to irradiate a sample on a sample surface of a sample holder with a pulse of laser energy and generate sample ions by MALDI; a first ion optics system configured to extract sample ions where the first ion optics system is connected to a heater system; and a temperature-controlled surface disposed substantially around the first ion optics system. Suitable heater systems include, but are not limited to, resistive heaters and radiative heaters. In some embodiments, the heater system can raise the temperature of the first ion optics system to a temperature sufficient to desorb matrix material. In various embodiments, the heater system includes a heater capable of heating the first ion optics system to a temperature greater than about 70° C.

The temperature of the temperature-controlled surface can be actively controlled, for example, by a heating/cooling unit, or passively controlled, such as, for example, by the thermal mass of the temperature-controlled surface, placing the temperature-controlled surface in thermal contact with a heat sink, or combinations thereof.

In another aspect, a mass analyzer system that includes a sample holder, an optical system, a first ion optics system, a second ion optics system, and a mass analyzer is provided. In some embodiments, the mass analyzer includes a time-of-flight mass analyzer. The optical system is configured to irradiate a sample on a sample surface of the sample holder with a pulse of laser energy and generate sample ions by MALDI. In various embodiments, the pulse of laser energy strikes the sample at an angle within 10 degrees of the normal of the sample surface. In various embodiments, the pulse of laser energy strikes the sample at an angle within 5 degrees of the normal of the sample surface. In various embodiments, the pulse of laser energy strikes the sample at an angle within 1 degree or less of the normal of the sample surface.

In this aspect, the first ion optics system can be disposed between the sample holder and the mass analyzer and is configured to extract sample ions along a first ion optical axis. In some embodiments, the sine of the intersection angle the first ion optical axis with the sample surface is less than about 0.10, and in some embodiments less than about 0.01. Accordingly, in various embodiments, the first ion optical axis intersects the sample surface at an angle within 5 degrees or less of the normal of the sample surface. In various embodiments, the first ion optical axis intersects the sample surface at an angle within 1 degree or less of the normal of the sample surface. In various embodiments, the optical system is configured to substantially align the pulse of laser energy with the first ion optical axis.

Further in this aspect, the second ion optics system can be disposed between the first ion optics system and the mass analyzer, where the second ion optics system is configured to deflect sample ions from the first ion optical axis and onto a second ion optical axis. In various embodiments, the mass analyzer is positioned on the second ion optical axis to receive sample ions.

In various embodiments, the system further includes a third ion optics system disposed between the second ion optics system and the mass analyzer, where the third ion optics system is positioned to receive sample ions traveling along the second ion optical axis and configured to deflect ions from the second ion optical axis and into the mass analyzer. In some embodiments, the third ion optics system is positioned such that neutral molecules traveling from the sample holder along the first ion optical axis do not substantially collide with the third ion optics system.

In other various aspects, methods of providing sample ions for mass analysis using MALDI to generate the sample ions are provided. In various embodiments, the methods are suitable for providing sample ions for mass analysis by time-of-flight mass spectrometry, including, but not limited to, multi-dimensional mass spectrometry. Examples of suitable time-of-flight mass analysis systems and methods are described, for example, in U.S. Pat. No. 6,348,688, filed Jan. 19, 1999, and issued Feb. 19, 2002; U.S. application Ser. No. 10/023,203 filed Dec. 17, 2001; U.S. application Ser. No. 10/198,371 filed Jul. 18, 2002; and U.S. application Ser. No. 10/327,971 filed Dec. 20, 2002; the entire contents of all of which are herein incorporated by reference.

In one aspect, the methods irradiate a sample on a sample surface with a pulse of laser energy at an irradiation angle that is within 10 degrees or less of the normal of the sample surface to form sample ions by matrix-assisted laser desorption/ionization and extract sample ions are in a direction substantially normal to the sample surface with a first ion optics system. In some embodiments, the sine of the angle the incident pulse of laser energy forms with the sample surface is less than about 0.10, and in some embodiments less than about 0.01. Accordingly, in various embodiments, the optical system is configured to irradiate the sample on the sample surface of the sample holder with the pulse of laser energy at angle within 5 degrees or less of the normal of the sample surface; and, in various embodiments, the optical system is configured to irradiate the sample on the sample surface of the sample holder with the pulse of laser energy at angle within 1 degree or less of the normal of the sample surface.

In one aspect, the methods irradiate a sample on a sample surface with a pulse of laser energy to form sample ions by matrix-assisted laser desorption/ionization and extract sample ions are in an extraction direction substantially coaxial with the Poynting vector of the pulse of energy striking the sample. In various embodiments, the extraction direction is at an angle between about 5 degrees and 50 degrees with respect to the normal to the sample surface.

In one aspect, the methods produce sample ions by MALDI and extract sample ions using an accelerating electrical field to form an ion beam, such that, the angle of the trajectory at the exit from the accelerating electrical field of sample ions substantially at the center of the ion beam is substantially independent of sample ion mass. In various embodiments, sample ions are produced by irradiating a sample with a pulse of laser energy where the irradiation angle is substantially normal to the sample surface. In some embodiments, the sample ions so produced are extracted in an extraction direction that is substantially normal to the sample surface and the pulse of laser energy is substantially aligned with the extraction direction. In various embodiments, sample ions are produced by irradiating a sample with a pulse of laser energy where the Poynting vector of the pulse of energy intersecting the sample surface is substantially coaxial with the ion extraction direction.

BRIEF DESCRIPTION OF THE DRAWINGS

The foregoing and other aspects, embodiments, objects, features and advantages of the invention can be more fully understood from the following description in conjunction with the accompanying drawings. In the drawings like reference characters generally refer to like features and structural elements throughout the various figures. The drawings are not necessarily to scale, emphasis instead being placed upon illustrating the principles of the invention.

DETAILED DESCRIPTION OF VARIOUS EMBODIMENTS

Figure 1:
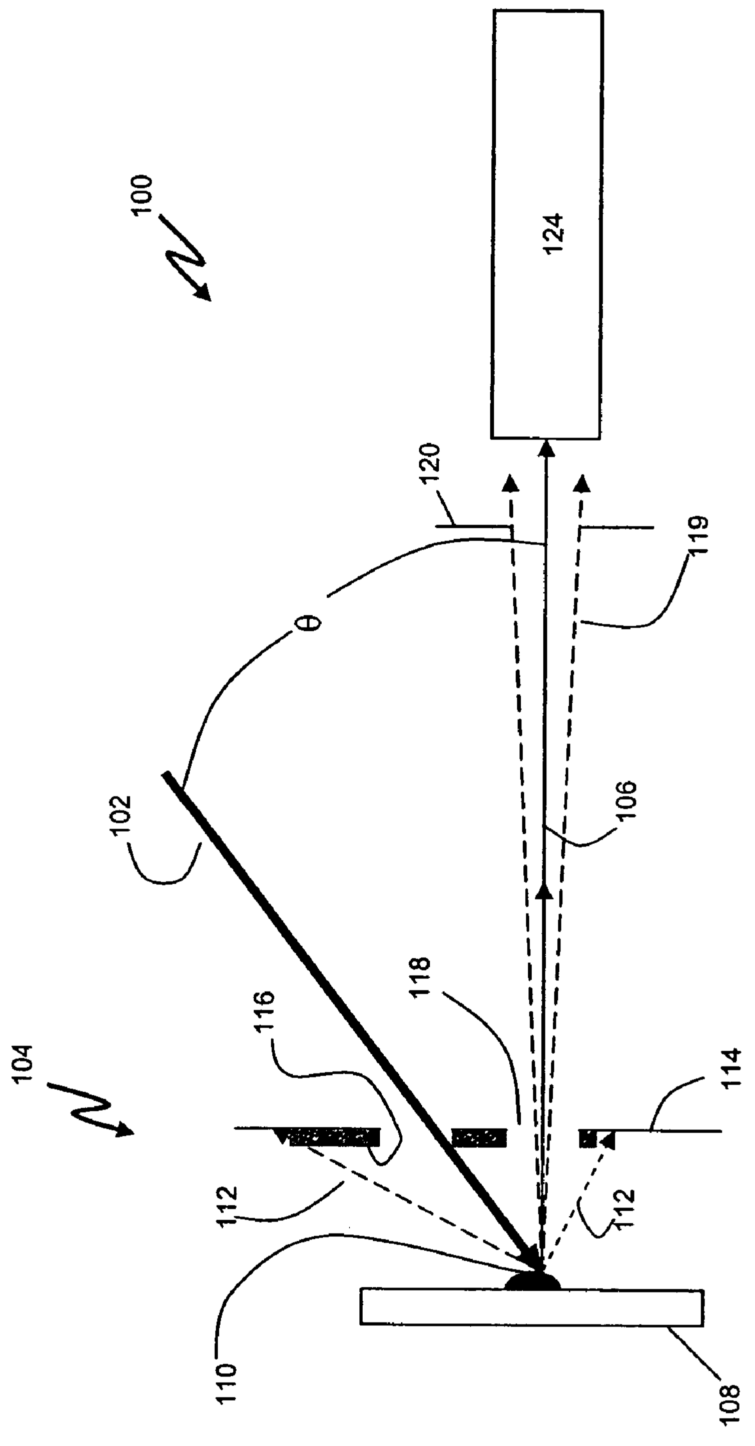
FIGURE 1 (PRIOR ART)
FIG. 1 is an example of a conventional MALDI source and mass analyzer system (Prior Art).
Figure 2:
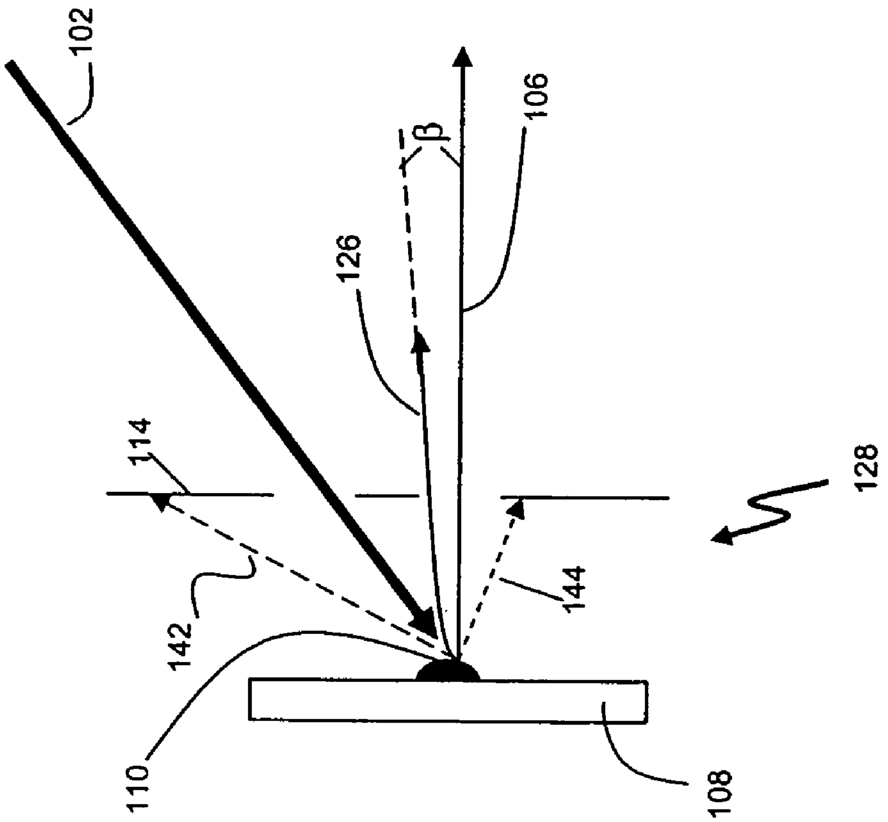
FIGURE 2 (PRIOR ART)
FIG. 2 is an expanded view of the MALDI ion source of FIG. 1 (Prior Art).

To better understand the present teachings, an example of a conventional MALDI source and mass analyzer system is illustrated in FIG. 1 and an expanded view of the MALDI ion source of FIG. 1 is shown in FIG. 2. In a typical conventional MALDI-mass analyzer system 100, the laser 102 enters the MALDI ion source 104 out of the nominal path of ion extraction 106 and strikes the sample plate 108 at an angle θ relative to the normal to the plate, which is typically between 30 and 60 degrees. In typical operation, the laser beam 102 enters through a window in the vacuum envelope (not shown) and strikes the sample embedded in a suitable matrix 110 on the sample plate 108. The laser intensity is increased until a plume of neutral molecules and ions are emitted from the sample following each incident laser pulse. At laser fluences somewhat above the threshold for producing ions this plume is centered about the incident laser beam 102 and comprises a cone 112 with a half-angle typically between 30 and 60 degrees. A potential difference is applied between the sample plate 108 and a first apertured plate 114 to accelerate the ions in a direction normal to the sample plate 108. In a delayed extraction MALDI application this potential difference is delayed by a predetermined time. Matrix molecules and other neutral species present in the plume strike the first apertured plate 114 and form a deposit 116 which is asymmetric about the aperture 118 in the first apertured plate 114. A portion of the desorbed neutrals 119, such as those traveling along the nominal path of ion extraction 106, typically pass through the aperture in the first plate 114 and subsequent plates 120 to enter the mass analyzer 124. Since these neutral species are mostly nonvolatile, they tend to stick to the surfaces they strike and form deposits. These deposits build up over time as additional samples are analyzed and form insulating layers on the apertured plates and on critical elements within the mass analyzer. These insulating layers may be charged up due to ions impacting on them, producing uncontrolled voltage variations that degrade the performance of the system.

Referring to FIG. 2, in addition, the angle p of the ion beam 126 with respect the nominal path of ion extraction 106 is dependent on the mass of the ions. That is, the angle of the trajectory of the samples ions on exiting the accelerating region 128 is dependent on sample ion mass. As a result, different sets of voltages are required to direct ions of different mass to the same location, such as, for example, the entrance to the mass analyzer; or, in other words, one set of voltages will direct ions of different mass to different locations. For example, conditions that enhance the transmission of ions at the high end of a mass range (e.g., 25,000 amu) into the mass analyzer will most likely decrease the transmission of ions at the low mass end of the mass range (e.g., 1,000 amu); thereby resulting in decreased dynamic mass range.

In various embodiments of a MALDI ion source of the invention, the source is configured to irradiate a sample on the sample surface of a sample holder with a pulse of laser energy at an angle relative to the normal of the sample surface that is notably less than 30 degrees.

A MALDI ion source in accordance with various embodiments includes an optical system configured to irradiate a sample on the sample surface of a sample holder with a pulse of laser energy and an ion optics system configured to extract the sample ions. In some embodiments, the ion optics system includes one or more deflectors to direct extracted sample ions off of the extraction direction and to a mass analyzer.

In various embodiments, the irradiation angle is within: (a) 10 degrees or less of the surface normal at the point of irradiation; (b) 5 degrees or less of the surface normal at the point of irradiation; and/or (c) 1 degree or less of the surface normal at the point of irradiation. Accordingly, it is to be understood that in some embodiments the irradiation angle is substantially normal to the sample surface at the point of irradiation. In various embodiments, the ion optics system initially extracts sample ions in a direction that is within: (a) 5 degrees or less of the normal of the sample surface; and/or (b) 1 degree or less of the normal of the sample surface. Accordingly, it is to be understood that in some embodiments the extraction direction is substantially normal to the sample surface.

In various embodiments, a MALDI ion source includes a temperature-controlled surface which is disposed substantially around at least a portion of the ion optics system and at least a portion of the ion optics system is connected to a heater system. In some embodiments, the heater system is configured and used to heat at least a portion of the ion optics system to decrease the amount of neutrals deposited on elements of the ion optics system. The amount of neutral deposition can be reduced by heating elements of the ion optics system to, for example, decrease the sticking probability of neutrals on the heated surfaces, volatizing deposits, or both. In some embodiments, the temperature-controlled surface is configured and used to capture neutral molecules and thereby reduce the amount of neutrals deposited on elements of the ion optics system. The amount of neutral deposition on the ion optics can be reduced by setting the temperature of the temperature-controlled surface lower than that of the elements of the ion optics system to, for example, increase the sticking probability of neutrals on the temperature controlled surface, capture desorbed neutrals, or both.

In various embodiments, one or more the elements of the ion optics system are heated such that matrix molecules do not substantially stick to these elements; thereby reducing the buildup of insulating layers on these elements. The neutral plume generated in MALDI can contain a small amount of nonvolatile non-matrix material that can also build up an insulating layer, but the concentration of this non-matrix material is generally several orders of magnitude lower than that of the matrix. This generally results in a much longer time before non-matrix material deposits become significant. In addition, in various embodiments, heating an optic system element surface generally reduces the resistivity of such deposits and thus further facilitates diminishing the effect of asymmetric charging deflecting the ion beam.

In various embodiments, the heater system includes a heater capable of heating the elements of the ion optics system which are heated to a temperature sufficient to desorb one or more the matrix materials listed in Table 1. The right column of Table 1 lists some of the typical uses for the associated matrix material in MALDI studies.

TABLE 1

| Matrix Material | Typical Uses |
|---|---|
| 2,5-dihydroxybenzoic acid (2,5-DHB) MW 154.03 Da | Peptides, neutral or basic carbohydrates, glycolipids, polar and nonpolar synthetic polymers, small molecules |
| Sinapinic Acid MW 224.07 Da | Peptides and Proteins >10,000 Da |
| a-cyano-4-hydroxy cinnamic acid (aCHCA) MW 189.04 Da | Peptides, proteins and PNAs <10,000 Da |
| 3-hydroxy-picolinic acid (3-HPA) MW 139.03 Da | Large oligonucleotides >3,500 Da |
| 2,4,6-Trihydroxy acetophenone (THAP) MW 168.04 Da | Small oligonucleotides <3,500 Acidic carbohydrates, acidic glycopeptides |
| Dithranol MW 226.06 Da | Nonpolar synthetic polymers |
| Trans-3-indoleacrylic acid (IAA) MW 123.03 Da | Nonpolar polymers |
| 2-(4-hydroxyphenylazo)-benzoic acid (HABA) MW 242.07 Da | Proteins, Polar and nonpolar synthetic polymers |
| 2-aminobenzoic (anthranilic) acid MW 137.05 Da | Oligonucleotides (negative ions) |

In various embodiments, the heater system can raise the temperature of the elements of the ion optics system which are heated to a temperature sufficient to desorb matrix material.

In various embodiments, the one or more of the elements of the ion optics system in the ion source are heated periodically to a sufficiently high temperature to rapidly vaporize any deposits on the surfaces of these elements. In various embodiments, a "blank" or "dummy" sample holder is substituted for the MALDI sample holder so that the deposits formed, for example, one or more elements of the ion optics system can be redeposited on the blank (which can be removed from the instrument), the temperature-controlled surface, or both.

As used herein, the term "ion optics system" includes, but is not limited to, one or more electrodes to which an electrical potential is applied to influence the motion of ions, such as, e.g., to accelerate, decelerate, deflect, or focus ions. A variety of electrode shapes and configurations can be used including, but not limited to, plates, grids, and cones. In various embodiments of ion optic systems, the ion optics system is described in terms of first, second, and or third ion optics systems to facilitate concise description and such terminology is not intended to be limiting.

Ion optics systems can include a first electrode positioned to extract sample ions. A potential difference is applied between the sample surface and the first electrode to accelerate sample ions of given charge sign (i.e., either positive or negative) in a direction away from the sample surface. In some embodiments, the first electrode is a substantially planar plate or grid that is substantially parallel to the sample surface. In some embodiments, the sample holder is positioned such that the aperture in the first apertured electrode is substantially centered on the sample being irradiated. For example, the sample holder can be held by a sample holder receiving stage capable of one-axis translational motion, x-y (2 axis) translational motion, or x-y-z (3 axis) translational motion. Where the aperture in the first electrode is substantially centered on the sample being irradiated and the first apertured electrode is substantially symmetric about the normal to the sample surface, the extraction direction will be substantially normal to the sample surface.

In some embodiments, the sample holder is capable of holding a plurality of samples. Suitable sample holders include, but are not limited to, 64 spot, 96 spot and 384 spot plates. The sample includes a matrix material that absorbs at a wavelength of the pulse of laser energy and which facilitates the desorption and ionization of molecules of interest in the sample.

Application of the potential difference between the sample holder and first electrode that accelerates sample ions away from the sample surface can be delayed by a predetermined time subsequent to generation of the pulse of laser energy to perform, for example, delayed extraction. In some embodiments, delayed extraction is performed to provide time-lag focusing to correct for the initial sample ion velocity distribution, for example, as described in U.S. Pat. No. 5,625,184 filed May 19, 1995, and issued Apr. 29, 1997; U.S. Pat. No. 5,627,369, filed Jun. 7, 1995, and issued May 6, 1997; U.S. Pat. No. 6,002,127 filed Apr. 10, 1998, and issued Dec. 14, 1999; U.S. Pat. No. 6,541,765 filed May 29, 1998, and issued Apr. 1, 2003; U.S. Pat. No. 6,057,543, filed Jul. 13, 1999, and issued May 2, 2000; and U.S. Pat. No. 6,281,493 filed Mar. 16, 2000, and issued Aug. 28, 2001; and U.S. application Ser. No. 10/308,889 filed Dec. 3, 2002; the entire contents of all of which are herein incorporated by reference. In other embodiments, delayed extraction can be performed to correct for the initial sample ion spatial distribution, for example, as described in W. C. Wiley and I. H. McLaren, *Time-of-Flight Mass Spectrometer with Improved Resolution*, Review of Scientific Instruments, Vol. 26, No. 12, pages 1150–1157, (December 1955), the entire contents of which are herein incorporated by reference.

In addition to a first electrode, ion optics systems, can include one or more of the following: (a) a second electrode; (b) a first ion deflector; (c) a first ion deflector positioned between the first electrode and a second electrode; (d) a third electrode; (e) a first ion deflector positioned between a second electrode and a third electrode; (f) a fourth electrode; (g) a second ion deflector; and (h) one or more ion lenses (such as, e.g., einzel lenses).

In various embodiments, the ion optics system includes a second electrode in addition to the first electrode. In some embodiments, the second electrode is a substantially planar plate or grid that is substantially parallel to the first electrode. In some embodiments, both the first and second electrodes have apertures. In various embodiments, sample ions are extracted along a first ion optical axis defined by the axis running through the centers of apertures in the first electrode and the second electrode. In various embodiments, the optical system is configured to substantially align the pulse of laser energy with the first ion optical axis.

Where the apertures in the first and second electrodes are substantially centered on the sample being irradiated and the first and second electrodes are substantially symmetric about the normal to the sample surface, the first ion optical axis will intersect the sample surface at an angle substantially normal to the sample surface, the extraction direction will be substantially normal to the sample surface, the extraction direction will be substantially parallel to the first ion optical axis, and sample ions will be extracted along the first ion optical axis.

In various embodiments, the ion optics system also includes a third electrode in addition to the first and second electrodes. In some embodiments, the third electrode is an apertured electrode that is a substantially planar plate or grid. In various embodiments, the third electrode is positioned so the centers of the apertures of the first, second, third apertured electrodes substantially fall on a common axis. In various other embodiments, the third electrode is positioned off the axis running through the centers of the apertures in the first and second electrode.

In various embodiments, the ion optics system also includes a third electrode in addition to the first and second electrodes. In some embodiments, the third electrode is an apertured electrode that is a substantially planar plate or grid. In various embodiments, the third electrode is positioned so the centers of the apertures of the first, second, third apertured electrodes substantially fall on a common axis. In various other embodiments, the third electrode is positioned off the axis running through the centers of the apertures in the first and second electrode. In various embodiments where the third electrode is positioned off the axis running through the centers of the apertures in the first and second electrode, the third electrode is positioned such that neutral molecules traveling from the sample holder along the extraction direction do not substantially collide with the third electrode.

In various embodiments, the ion optics system includes a first ion deflector positioned to deflect sample ions in a direction different from the extraction direction. In various embodiments, the first ion deflector is positioned between the first electrode and a second electrode. In various embodiments, a third electrode is positioned off the axis running through the centers of the apertures in the first and second electrode such that the third electrode can receive deflected sample ions; and in some embodiments, the third electrode is positioned such that it facilitates directing sample ions into a mass analyzer.

In various embodiments including a third electrode, a first ion deflector is positioned between the second and third electrodes to deflect sample ions in a direction different from the extraction direction. In various embodiments, the first, second and third electrodes have apertures, the centers of the apertures of the first, second, third apertured electrodes substantially fall on a common axis and that the first, second, third apertured electrodes are substantially parallel to each other.

In various embodiments, the ion optics system includes a second ion deflector in addition to a first ion deflector, where the second ion deflector is positioned to receive sample ions deflected by the first ion deflector and facilitate directing sample ions into a mass analyzer. In some embodiments, the second ion deflector is positioned such that neutral molecules traveling from the sample holder along the extraction direction do not substantially collide with the second ion deflector.

In some embodiments, the second ion deflector is also associated with an electrode which is positioned to facilitate directing sample ions into the second ion deflector. Examples, of various embodiments of an ion optics system having a second ion deflector and associated electrode include, but are not limited to: (a) a first ion deflector positioned between first and second apertured electrodes and a third electrode positioned to facilitate directing sample ions into the second ion deflector; (b) a first ion deflector positioned between first and second apertured electrodes, a third electrode positioned substantially parallel to the second electrode, and a fourth electrode positioned to facilitate directing sample ions into the second ion deflector; and (c) a first ion deflector positioned between second and third apertured electrodes and a fourth electrode positioned to facilitate directing sample ions into the second ion deflector. In some embodiments, an electrode associated with the second ion deflector is positioned such that neutral molecules traveling from the sample holder along the extraction direction do not substantially collide with the associated electrode.

In various embodiments, one or more electrical potentials applied to a second ion deflector, an associated electrode, or both are used to modify the translational energy of sample ions to facilitate, for example, focusing by the mass analyzer. In various embodiments, one or more electrical potentials applied to a second ion deflector, an associated electrode, or both are used to modify the translational energy of sample ions to adjust there collision energy with other molecules or surfaces to facilitate, for example, CID or surface induced dissociation (SID) of the ions. In various embodiments, one or more electrical potentials applied to a second ion deflector, an associated electrode, or both are used to compensate for changes in a mode of operation of the mass analyzer, such as, for example, between a linear and reflecting mode in certain TOF mass analyzers.

Ion generation by MALDI produces a plume of neutral molecules in addition to ions. In various embodiments, a portion of this neutral plume passes through apertures in one or more electrodes and forms essentially a cone with an axis substantially along the extraction direction. The size of the aperture in the last electrode and the distance between the last electrode and the sample surface determines the half-angle δ of the cone about the neutral beam axis that travels beyond the last electrode. In various embodiments where an ion optical element (such as, for example, a third electrode, a fourth electrode, a second deflector, or combinations thereof) is positioned off the axis running through the centers of the apertures in the first and second electrode, these optical elements can be positioned such that neutral molecules in the neutral beam do not substantially collide with the off-axis ion optical element. In various embodiments, such an off-axis ion optical element is positioned a distance L away from the neutral beam axis in a direction perpendicular to the neutral beam axis. In various embodiments, the off-axis optical element is positioned at a distance L such that the neutral beam intensity at L is at least less than: 14 percent of the neutral beam intensity at the neutral beam axis; 5 percent of the neutral beam intensity at the neutral beam axis; or 1 percent of the neutral beam intensity at the neutral beam axis. In various embodiments, the off-axis ion optical element is positioned such that L is at least a distance $L_{min}$ away where $L_{min}$ can be determined by, $$L_{min}=z\tan(\delta) \quad (1)$$

where z is the distance in the extraction direction between the off-axis ion optical element and the sample surface, and δ is the half-angle of the neutral beam cone that travels beyond the last element that determines the half-angle δ of the neutral beam cone.

A MALDI ion source in accordance with various embodiments includes an optical system configured to irradiate a sample on the sample surface of a sample holder with a pulse of laser energy with a irradiation angle that is at least within 10 degrees of the normal of the sample surface at the point of irradiation. In various embodiments, the optical system can comprise a lens or window. The optical system can also comprise a mirror or prism (not shown) to direct the pulse of laser energy onto the sample. The pulse of laser energy can be provided, for example, by a pulsed laser or continuous wave (cw) laser. The output of a cw laser can be modulated to produce pulses using, for example, acoustic optical modulators (AOM), crossed polarizers, rotating choppers, and shutters. Any type of laser of suitable irradiation wavelength for producing sample ions of interest by MALDI can be used with the ion sources and mass analyzer systems of the present invention, including, but not limited to, gas lasers (e.g., argon ion, helium-neon), dye lasers, chemical lasers, solid state lasers (e.g., ruby, neodinium based), excimer lasers, diode lasers, and combination thereof (e.g., pumped laser systems). In various embodiments, the optical system is configured to substantially align the pulse of laser energy with the direction of ion extraction.

Figure 3:
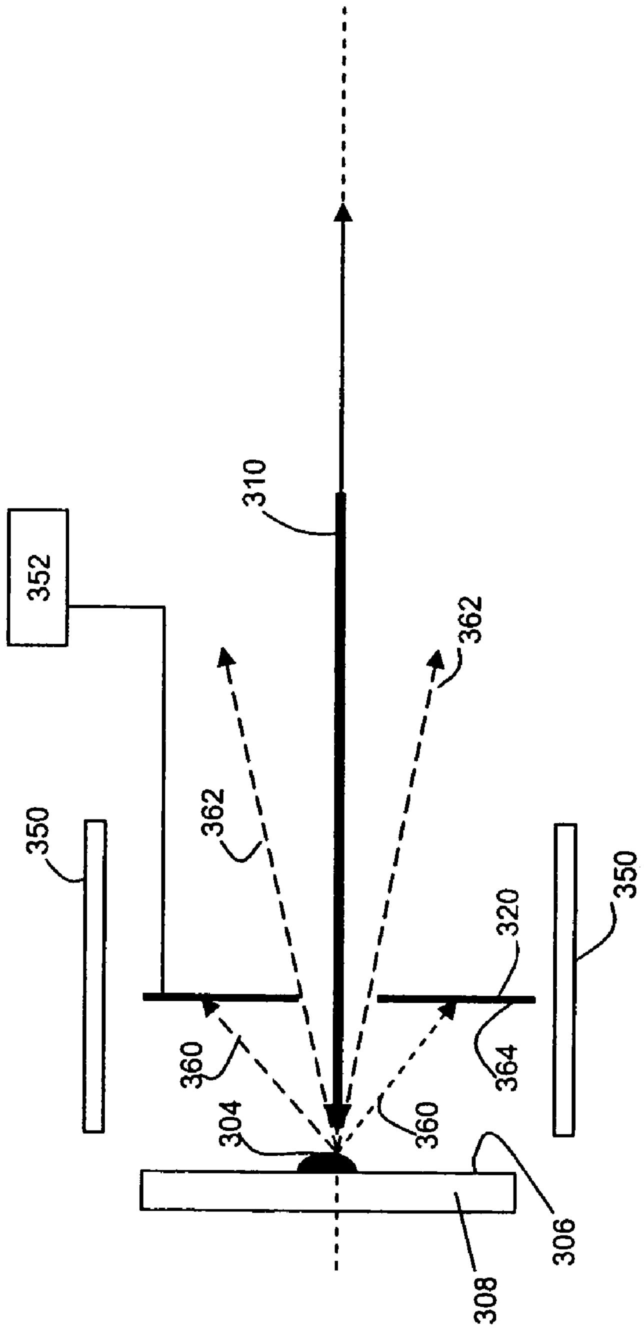
FIG. 3 schematically illustrates an expanded view of a MALDI ion source in accordance with various embodiments.

Referring to FIG. 3, in various embodiments, a MALDI ion source includes an optical system configured to irradiate a sample 304 on the sample surface 306 of a sample holder 308 with a pulse of laser energy 310 at an angle within 10 degrees or less of the normal to the sample surface 306. In some embodiments, the pulse of laser energy strikes the sample 304 at an angle substantially normal to the sample surface 306. The ion optics system includes a first electrode, which in various embodiments is an apertured electrode 320. In some embodiments, the first apertured electrode 320 can be a substantially planar plate or grid positioned substantially parallel to the sample surface 306; and the sample holder 308 is positioned such that the axis of the aperture is centered on the sample being irradiated. In various embodiments, the MALDI ion source includes a temperature-controlled surface 350 disposed about at least a portion of the ion optics system, and a heater system 352 connected to the first electrode and capable of heating the first electrode.

In various embodiments, a pulse of laser energy 310 strikes a sample 304 and produces a plume of neutral molecules 360 and ions. A portion of this neutral plume or beam 362 passes through the aperture in the first apertured electrode 320 and a portion strike the sample side surface 364 of the first apertured electrode 320. This neutral plume 360 is substantially symmetric about the laser beam 310 and the axis of the aperture in the first electrode. The size of the aperture in the first electrode and the distance between the first electrode and the sample surface determines the half-angle of the cone of the neutral beam 362 that travels beyond the first apertured electrode.

In various embodiments, a heater system 352 is used to raise the temperature of the first electrode to decrease the probability that neutral molecules in the plume 360 will stick to it. In various embodiments, a temperature-controlled surface 350 is held at a temperature lower than that of the first electrode is used to capture neutral molecules and prevent their deposition on other surfaces.

In some embodiments, the first electrode is heated such that matrix molecules do not substantially stick to the first electrode; thereby reducing the buildup of insulating layers on this electrode. In various embodiments, the material deposits that result from ion formation are essentially symmetric about the axis of an aperture in the first electrode, which facilitates reducing the potential effects of asymmetric charging deflecting the ion beam. In addition, in various embodiments, heating an optic system element surface generally reduces the resistivity of such deposits and thus further facilitates diminishing the charging effect.

In various embodiments, the electrodes in the ion source are heated periodically to a temperature sufficient to vaporize deposits on the electrodes. In various embodiments, a blank is substituted for the MALDI sample holder so that the deposits formed, for example, on the first electrode can be redeposited on the blank.

Figure 4:
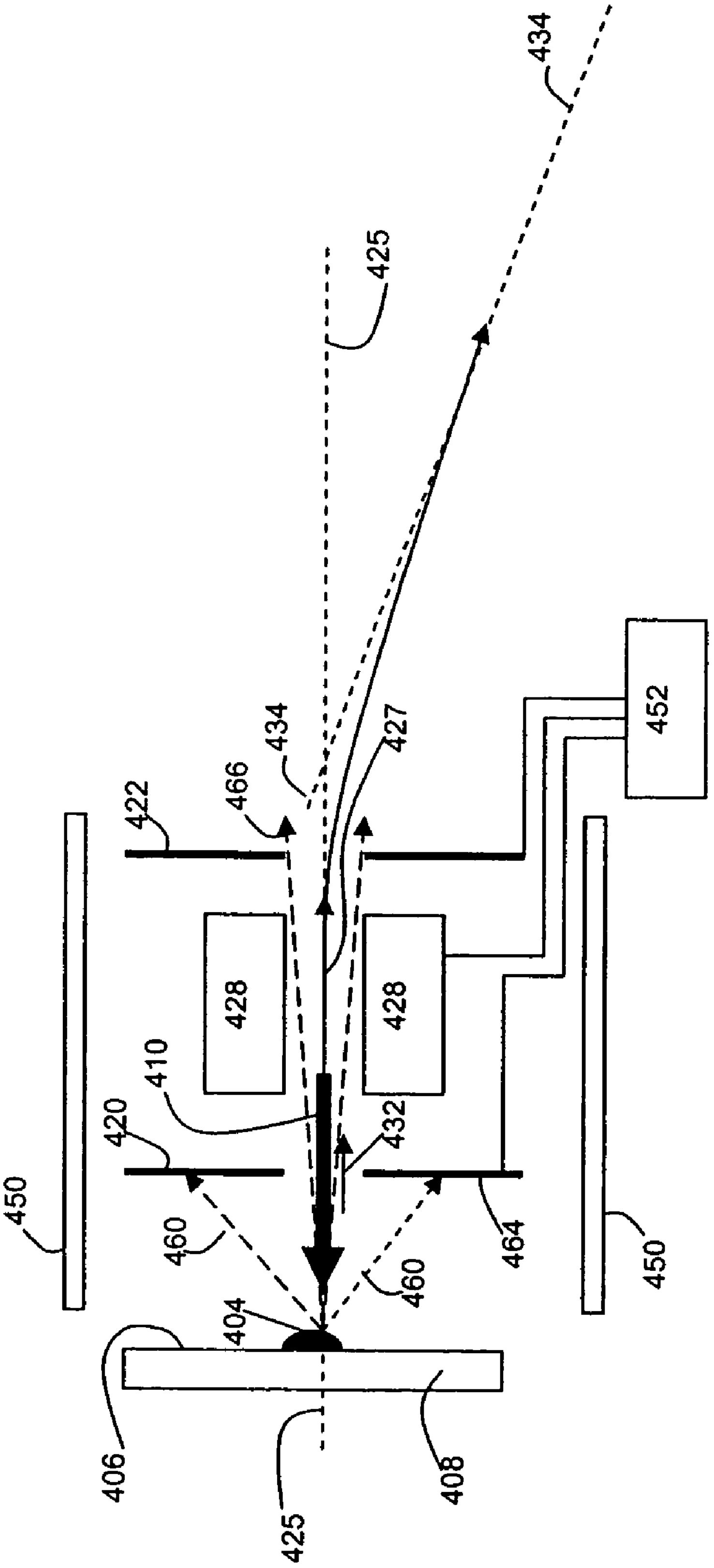
FIG. 4 schematically illustrates a MALDI ion source in accordance with various embodiments.
Figure 5:
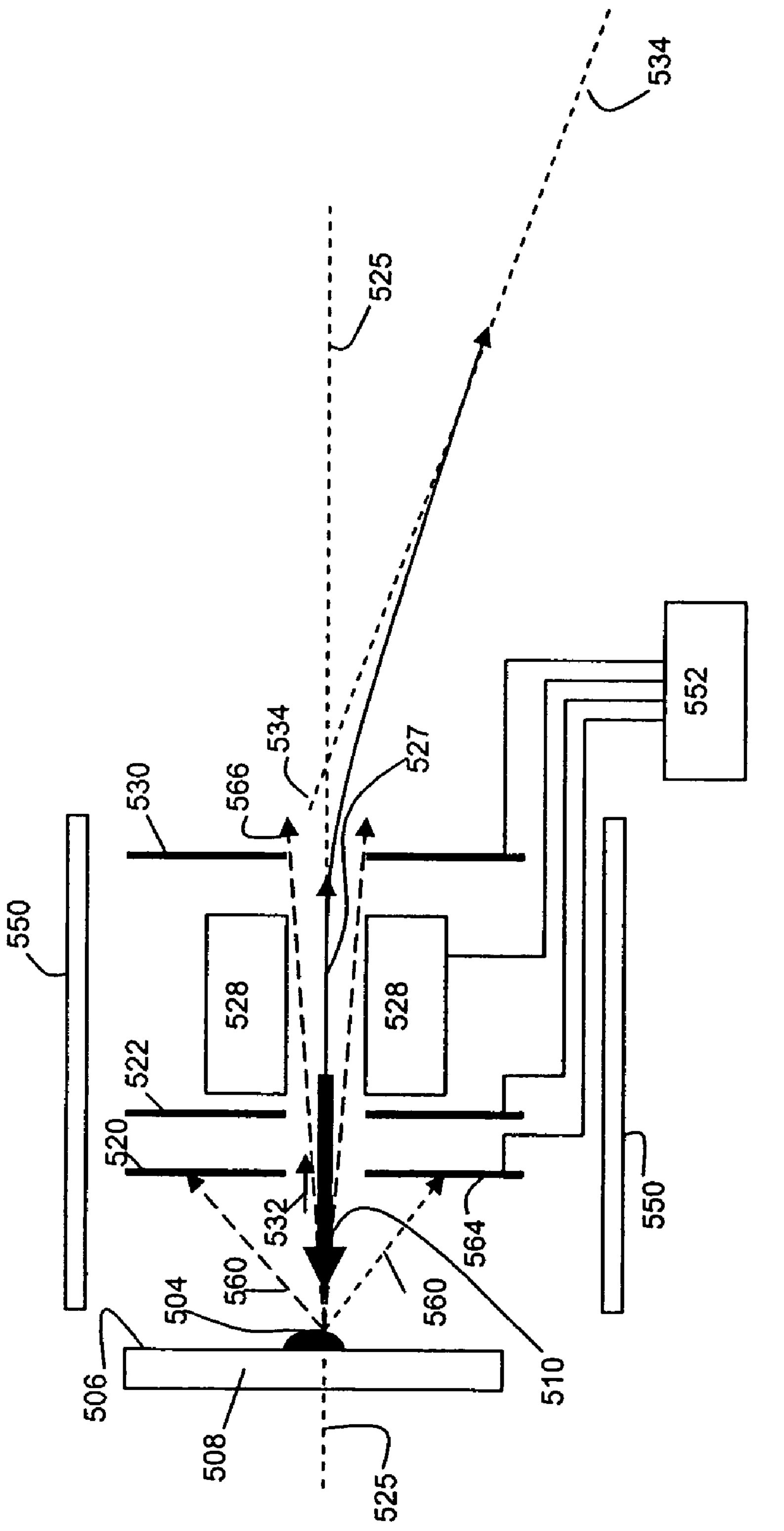
FIG. 5 schematically illustrates a MALDI ion source in accordance with various embodiments.

FIGS. 4 and 5 depict various embodiments of MALDI ion sources. Referring to FIGS. 4 and 5, in various embodiments, the MALDI ion source includes an optical system configured to irradiate a sample 404, 504 on the sample surface 406, 506 of a sample holder 408, 508 with a pulse of laser energy 410, 510 at an angle within 10 degrees or less of the normal to the sample surface. In some embodiments, the pulse of laser energy strikes the sample at an angle substantially normal to the sample surface. In various embodiments, the MALDI ion source also includes an ion optics system that is configured to extract sample ions in a direction within 5 degrees or less of the normal to the sample surface; and in some embodiments in a direction substantially normal to the sample surface.

In various embodiments, the ion optics system comprises a first electrode 420, 520 and a second electrode 422, 522. In some embodiments both the first and second electrodes have an aperture and the line between the centers of the apertures defines a first ion optical axis 425, 525 which intersects the sample surface at an angle within 5 degrees or less of the normal to the sample surface. A potential difference is applied between the sample surface and the first electrode to accelerate sample ions of given charge sign (i.e., either positive or negative) in a direction away from the sample surface and sample ions are extracted to form an ion beam 427, 527. In various embodiments, the ion optics system includes a first ion deflector 428, 528 positioned to deflect sample ions.

Referring to FIG. 4, in various embodiments, the first ion deflector 428 is positioned between the first electrode 420 and the second electrode 422 to deflect sample ions in a direction different from the extraction direction 432 and onto a second ion optical axis 434. Referring to FIG. 5, in various embodiments, the first ion deflector 528 is positioned between the second electrode 522 and a third electrode 530 to deflect sample ions in a direction different from the extraction direction 532 and onto a second ion optical axis 534.

Referring again to FIGS. 4 and 5, in various embodiments, the MALDI ion source includes a temperature-controlled surface 450, 550 disposed about at least a portion of the ion optics system, and a heater system 452, 552 connected at least to the first electrode 422, 522 and capable of heating the first electrode. In some embodiments, the heater system 452, 552 is connected to all the ion optics system elements about which the temperature-controlled surface 450, 550 is disposed, the ion optic system elements in the path of the neutral beam, or both. In various embodiments, the heater system 452, 552 is connected to the first electrode 420, 520, the second electrode 422, 522, and the first ion deflector 428, 528.

In various embodiments, a pulse of laser energy 410, 510 strikes a sample 404, 504 and produces a plume of neutral molecules 460, 560 and ions. A portion of this neutral plume or beam passes through the aperture in the first apertured electrode 420, 520 and a portion strike the sample side surface 464, 564 of the first apertured electrode 420, 520. A portion of this neutral plume or beam 466, 566 passes through the aperture in a last electrode. The size of the aperture in the second electrode and the distance between the last electrode and the sample surface determines the half-angle of the cone of the neutral beam 466, 566 that travels beyond the last electrode.

In various embodiments, a heater system 452, 552 is used to raise the temperature of the first electrode and second electrode to decrease the probability that neutral molecules in the plume will stick to them. In various embodiments, a temperature-controlled surface 450, 550 is held at a temperature lower than that of the first electrode and that of the second electrode is used to capture neutral molecules and prevent their deposition on other surfaces. In some embodiments, the first electrode and second electrode are heated such that matrix molecules do not substantially stick to them. In various embodiments, the first ion deflector is heated such that matrix molecules do not substantially stick to it.

In various embodiments, the first and second electrodes in the ion source are heated periodically to a temperature sufficient to vaporize deposits on the electrodes. In various embodiments, a blank is substituted for the MALDI sample holder so that the deposits formed, for example, on the first electrode can be redeposited on the blank. In various embodiments, the first ion deflector is heated periodically to a temperature sufficient to vaporize deposits on the electrodes and a blank is substituted for the MALDI sample holder so that the deposits formed, for example, on the first ion deflector can be redeposited on the blank.

In various embodiments, a MALDI ion source can provide an ion beam where the angle of the trajectory at the exit from an acceleration region of the ion source of sample ions substantially at the center of the ion beam is substantially independent of sample ion mass. In some embodiments, such a trajectory is provided by irradiating a sample on a sample surface of a sample holder with a pulse of laser energy at an irradiation angle substantially normal to the sample surface and extracting the sample ions in a direction substantially normal to the sample surface to form the ion beam.

As an example, consider two cases: one in which the laser beam is incident on a sample at an angle of 30 degrees with respect to the normal to the sample surface of the sample holder; and another in which the laser beam is incident on the sample at an angle substantially normal to the sample surface of the sample holder. The center of the ion beam, or favored initial direction, for sample ions emitted from the MALDI target is back along the incident laser beam, and the distribution around this favored direction forms a cone similar to the cone of neutral particles that are emitted. Inspection of the deposit of matrix on the first electrode of ion sources shows that neutral deposition is typically contained within a cone with half-angle less than 45 degrees about the laser beam. The sample ion emission is believed to be similar to that of the neutrals, and the initial velocity distribution of the sample ions is at least approximately independent of the mass of the sample ion. The average initial velocity of the sample ions is typically a few hundred meters per second, which depends to some extent on the choice of matrix. For this example we choose an initial sample ion velocity of 500 m/sec and a uniform distribution of directions within the 45 degree cone about the laser beam.

The velocity vector of an ion after acceleration is determined by the initial velocity vector of the ion, the applied voltage, the length of the accelerating field and the mass-to-charge ratio of the ion. The velocity components of a sample ion after acceleration in a uniform field can be expressed as:

$$v_x = v_0 \cos\alpha + (2zV/m)^{1/2} \quad (2)$$

$$v_y = v_0 \sin\alpha \quad (3)$$

where $v_x$ is the velocity component parallel to the accelerating field, $v_y$ is the velocity component perpendicular to the accelerating field, $v_0$ is the magnitude of the initial velocity, $\alpha$ is the angle of the initial sample ion velocity vector relative to the normal to the sample plate, z is the charge on the ion, V is the magnitude of the accelerating potential, and m is the mass of the sample ion. In this example, equation (2) can be approximately written for singly charged ions as:

$$v_x = 500 \cos\alpha + 13{,}900(V/m)^{1/2} \quad (4)$$

$$v_y = 500 \sin\alpha \quad (5)$$

where the velocities are in meters per second, the electrical potential in volts, the mass in Daltons, the x-axis is orientated parallel to the accelerating field and the y-axis is perpendicular to the field. The angle of the ion trajectory at the exit from the accelerating field (neglecting any focusing effect at the exit) can be given by:

$$\beta = \tan^{-1}(v_y/v_x) \quad (6)$$

The displacement in the y direction of the ion trajectory at the exit from the accelerating field relative to the starting point on the sample surface of the sample holder can be given by:

$$y_0 = 2d_0(v_y/v_x) \quad (7)$$

where $d_0$ is the distance between the sample surface of the sample holder and the first electrode. In the absence of focusing elements the displacement in the y direction at any point along the trajectory can be given by $$y=y_0+d(v_y/v_x) \qquad (8)$$

where d is the distance from the first electrode in the x direction.

Angles and displacements for the case of 30 degree incident and normal incident pulse of laser energy are compared in Table 1 for sample ions with initial velocity vectors along (Center Ray) the incident laser beam, sample ions with initial velocity vectors at +45 degrees (Upper Ray) with respect to the incident laser beam, and sample ions with initial velocity vectors at −45 degrees (Lower Ray) with respect to the incident laser beam. The values of Table 2 were calculated using $v_0$=500 m/sec, V/m=1 volt/da, and $d_0$=20 mm, the values of the angles are in units of degrees, the values of $y_0$ and y are in units of millimeters, and the value of y was calculated for d=100 mm. If V/m=100 volt/da, then the values of β, $y_0$ and y are decreased by a factor of ten as shown by equations 4–8.

TABLE 2

| Case | Ray | α | β | $y_0$ | y (at d = 100 mm) |
|---|---|---|---|---|---|
| 30 Degree | Center | 30 | 1.0 | 0.7 | 2.5 |
| Incidence | Upper | 75 | 2.0 | 1.4 | 5.0 |
| | Lower | −15 | −0.5 | −0.4 | −1.3 |
| Normal | Center | 0 | 0 | 0 | 0 |
| Incidence | Upper | 45 | 1.4 | 1.0 | 3.5 |
| | Lower | −45 | −1.4 | −1.0 | −3.5 |

Figure 6B:
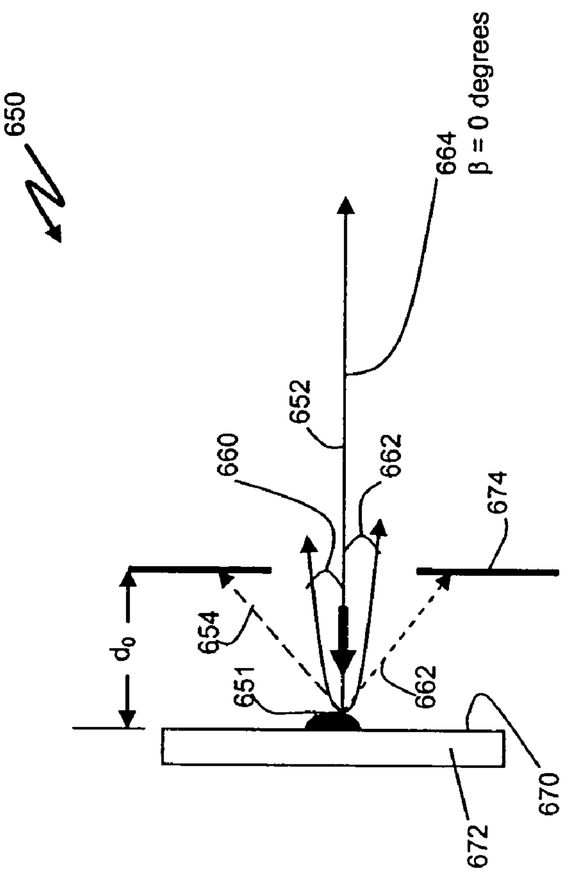
FIG. 6B schematically illustrates a MALDI ion source in accordance with various embodiments with illustrative ion trajectories.
Figure 6A:
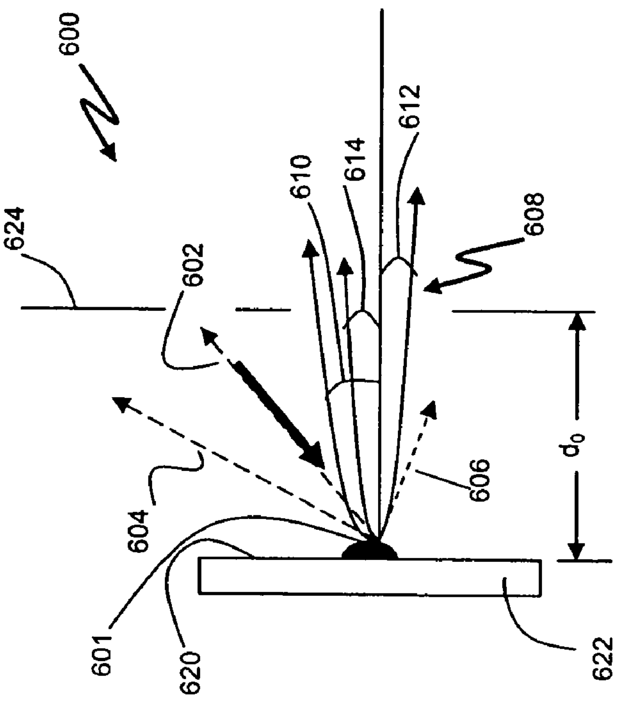
FIG. 6A is an example of a conventional MALDI source with illustrative ion trajectories.

FIGS. 6A and 6B schematically illustrate the trajectories in Table 2 for a conventional MALDI source 600, FIG. 6A, and a MALDI ion source in accordance with various embodiments 650, FIG. 6B. The angles α and β in FIGS. 6A and 6B are approximate only, and the angles β and displacements $y_0$ and y (at 100 mm) have been exaggerated for illustrative purposes. FIG. 6A illustrates trajectories for ions generated from a sample 601 in the 30 degree incidence case with initial velocities along the Center Ray 602, the Upper Ray 604, and the Lower Ray 606; and the angle of their trajectory at the exit from the accelerating field 608. FIG. 6A also illustrates the Upper Ray β angle 610, the Lower Ray β angle 612, the Center Ray β angle 614 in Table 2, and the distance $d_0$ between the sample surface 620 of the sample holder 622 and a first electrode 624.

FIG. 6B illustrates trajectories for ions generated from a sample 651 in the normal incidence case with initial velocities along the Center Ray 652, the Upper Ray 654, and the Lower Ray 656; and the angle of their trajectory at the exit from the accelerating field 658. FIG. 6B also illustrates the Upper Ray β angle 660, the Lower Ray β angle 662, the Center Ray β angle 664 in Table 2, and the distance $d_0$ between the sample surface 670 of the sample holder 672 and a first electrode 674.

Table 2 illustrates that in the case of 30 degree incident laser irradiation, the nominal direction (Center Ray) of the ion beam is mass dependent whereas in the case of normal incidence the nominal direction (Center Ray) of the ion beam is coincident with the laser beam for all masses and thus mass independent. In both cases the half-angle of the ion beam profile increases in proportion to the square root of the mass. In the 30 degree incidence case sample ions within a narrow mass range can be directed toward a mass analyzer by deflecting the ion beam with an appropriate deflection voltage, but sample ions outside this mass range may be transmitted inefficiently by this deflection voltage.

In the normal incidence case the appropriate deflection voltage is substantially independent of sample ion mass. In various embodiments, this allows the ion beam to be separated from the laser beam by deflection after acceleration without introducing mass discrimination using an off-axis mass analyzer as shown, for example, in FIG. 7. Furthermore in the normal incidence case, the ion beam can be focused for all masses by including, for example, additional apertured electrodes within the ion acceleration region, one or more ion lenses downstream, or combinations thereof.

Figure 7:
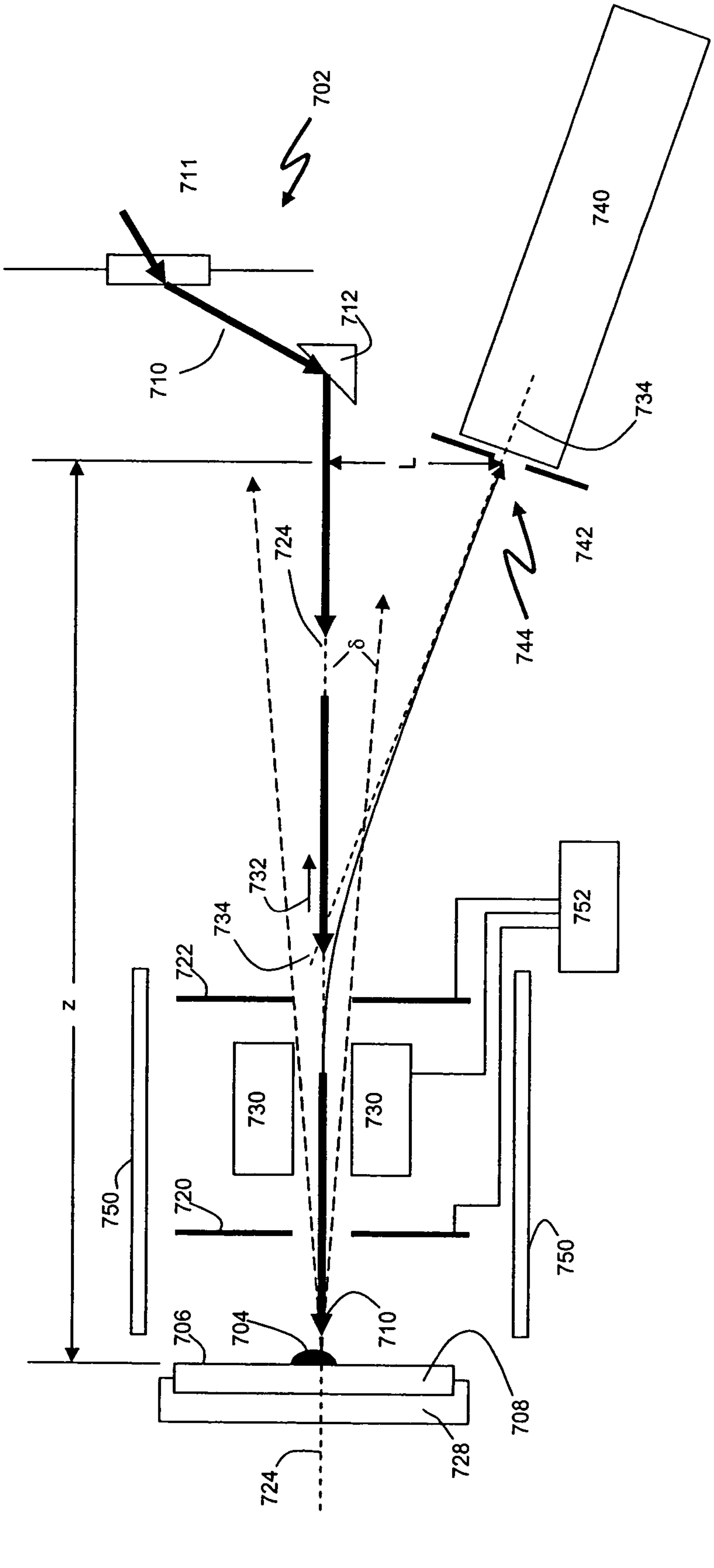
FIG. 7 schematically illustrates a MALDI ion source and mass analyzer system in accordance with various embodiments.

FIG. 7 depicts various embodiments of MALDI ion sources and mass analyzer systems. In one embodiment, the MALDI ion source includes an optical system 702 configured to irradiate a sample 704 on the sample surface 706 of a sample holder 708 with a pulse of laser energy 710 at angle substantially normal to the sample surface. In various embodiments, the optical system can comprise a lens or window 711. The optical system can also comprise a mirror or prism 712 to direct the pulse of laser energy onto the sample. In various embodiments, a mirror, prism or other photon steering mechanism is not required as the laser itself can be positioned such that the output of the laser irradiates the sample on the sample surface with a pulse of laser energy at an irradiation angle that is at least within 10 degrees of the normal to the sample surface at the point of irradiation.

In various embodiments, the MALDI ion source includes an ion optics system that is configured to extract sample ions in a direction substantially normal to the sample surface. The ion optics system includes a first apertured electrode 720 and a second apertured electrode 722. The line between the center of the aperture in the first electrode and the center of the aperture in the second electrode defines the first ion optical axis 724. In some embodiments, the first electrode 720 and second electrode are substantially planar plates or grids positioned substantially parallel to the sample surface 706 and each other.

Where the aperture in the first electrode is substantially centered on the sample being irradiated and the first apertured electrode is substantially symmetric about the normal to the sample surface, the extraction direction will be substantially normal to the sample surface. A variety of first electrodes shapes and configurations can be used that are substantially symmetric about the normal to the sample surface such as, but not limited to, plates, grids, and cones. Where the apertures in the first and second electrodes are substantially centered on the sample being irradiated and the first and second electrodes are substantially symmetric about the normal to the sample surface, the first ion optical axis will intersect the sample surface at an angle substantially normal to the sample surface, the extraction direction will be substantially normal to the sample surface, the extraction direction will be substantially parallel to the first ion optical axis, and sample ions will be extracted along the first ion optical axis.

In various embodiments, the aperture in the first electrode is substantially centered on the sample being irradiated by moving the sample holder 708. In some embodiments, the sample holder 708 is held by a sample holder receiving stage 828 capable of one-axis translational motion, x-y (2 axis) translational motion, or x-y-z (3 axis) translational motion to position a sample for irradiation.

In various embodiments of operation, a potential difference is applied between the sample surface 706 and the first apertured electrode 720 to accelerate the sample ions in an extraction direction that is within 5 degrees or less of the normal of the sample surface. In some embodiments, the ion source is configured and operates to accelerate sample ions in an extraction direction that is substantially normal to the sample surface. A first ion deflector 730 is positioned between the first apertured electrode 720 and the second apertured electrode 722 to deflect sample ions in a direction different from the extraction direction 732 and onto a second ion optical axis 734, and a mass analyzer 740 is positioned on the second ion optical axis 734 to receive sample ions. In various embodiments, a third apertured electrode 742 is positioned between the second electrode 722 and the mass analyzer 740 to facilitate directing sample ions into the mass analyzer 740.

In some embodiments, the entrance 744 to the mass analyzer 740, and any associated third electrode 742, are positioned a distance L off of the first ion optical axis 724 such that neutral molecules traveling from the sample holder along the extraction direction do not substantially collide with the entrance 744 to the mass analyzer or any associated third electrode 742. In various embodiments, the distance L is at least $L_{min}$ as given by equation (1), where examples of the distance z and half-angle δ of the neutral beam cone are illustrated in FIG. 7.

In various embodiments, MALDI ion sources and mass analyzer systems include a temperature-controlled surface 750 disposed about at least a portion of the ion optics system, and a heater system 752 connected at least to the first electrode 720 and capable of heating the first electrode. In some embodiments, the heater system 752 is connected to all the ion optics system elements about which the temperature-controlled surface 750 is disposed, the ion optic system elements in the path of the neutral beam, or both. In various embodiments, the heater system 752 is connected to the first electrode 720, the second electrode 722, and the first ion deflector 730.

In various embodiments, the heater system 752 is used to raise the temperature of the first electrode and second electrode to decrease the probability that neutral molecules in the plume will stick to them. In various embodiments, a temperature-controlled surface 750 is held at a temperature lower than that of the first electrode and that of the second electrode is used to capture neutral molecules and prevent their deposition on other surfaces. In some embodiments, the first electrode 720 and second electrode 722 are heated such that matrix molecules do not substantially stick to them. In various embodiments, the first ion deflector 730 is heated such that matrix molecules do not substantially stick to it.

In various embodiments, the first electrode 720 and second electrode 722 in the ion source are heated periodically to a temperature sufficient to vaporize deposits on the electrodes. In various embodiments, a blank is substituted for the MALDI sample holder so that the deposits formed, for example, on the first electrode can be redeposited on the blank, temperature-controlled surface, or both. In various embodiments, the first ion deflector 730 is heated periodically to a temperature sufficient to vaporize deposits on the electrodes and a blank is substituted for the MALDI sample holder so that the deposits formed, for example, on the first ion deflector can be redeposited on the blank, temperature-controlled surface, or both.

Figure 8:
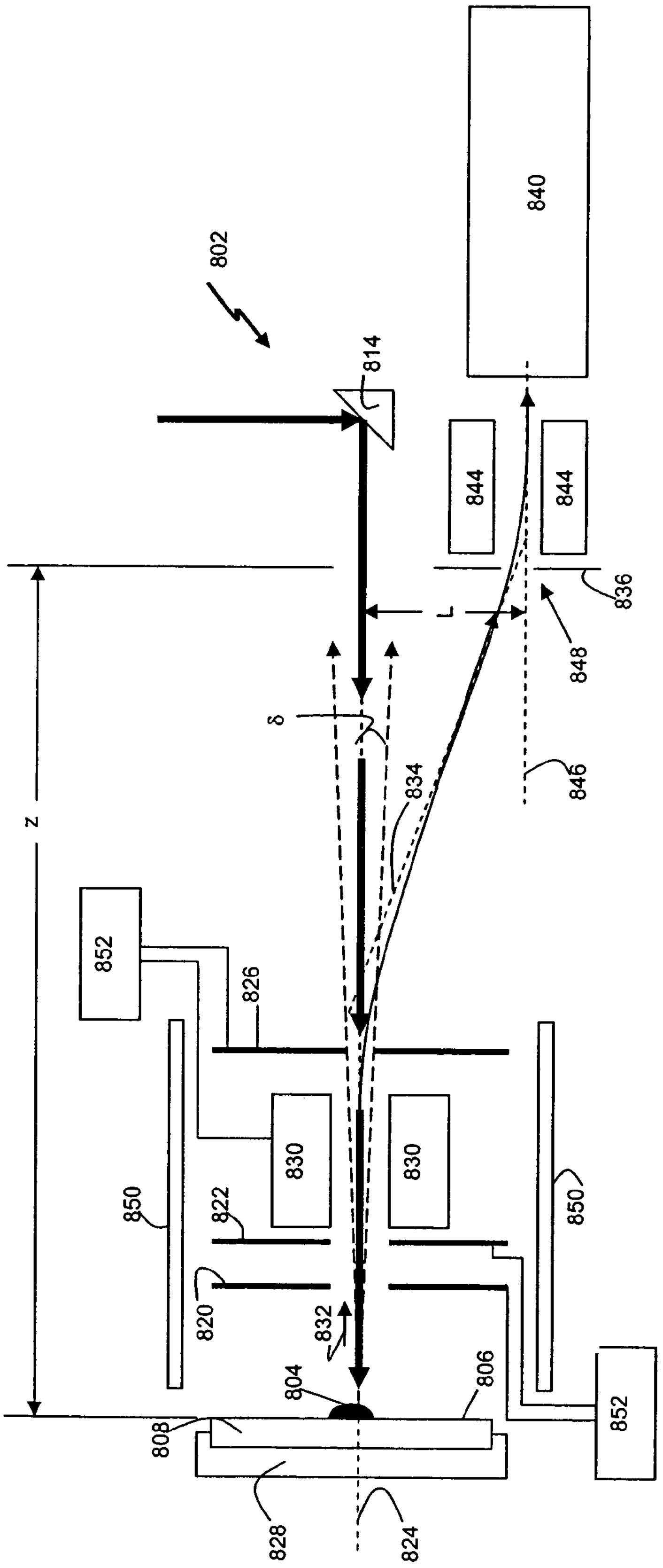
FIG. 8 schematically illustrates a MALDI ion source and mass analyzer system in accordance with various embodiments.

Referring to FIG. 8, various embodiments of MALDI ion sources and mass analyzer systems are depicted. In one embodiment, the MALDI ion source includes an optical system 802 configured to irradiate a sample 804 on the sample surface 806 of a sample holder 808 with a pulse of laser energy 810 at angle substantially normal to the sample surface. In various embodiments, the optical system can comprise a lens or window. The optical system can also comprise a mirror or prism 814 to direct the pulse of laser energy onto the sample.

In various embodiments, the MALDI ion source includes an ion optics system that is configured to extract sample ions in a direction substantially normal to the sample surface. In FIG. 8, the ion optics system includes a first apertured electrode 820 and a second apertured electrode 822. The line between the center of the aperture in the first electrode and the center of the aperture in the second electrode defines a first ion optical axis 824. In various embodiments, the ion optics system includes a third apertured electrode 826. In some embodiments, the first, second and third electrodes are substantially planar plates or grids positioned substantially parallel to the sample surface and each other.

Where the aperture in the first electrode is substantially centered on the sample being irradiated and the first apertured electrode is substantially symmetric about the normal to the sample surface, the extraction direction will be substantially normal to the sample surface. A variety of first electrodes shapes and configurations can be used that are substantially symmetric about the normal to the sample surface such as, but not limited to, plates, grids, and cones. Where the apertures in the first and second electrodes are substantially centered on the sample being irradiated and the first and second electrodes are substantially symmetric about the normal to the sample surface, the first ion optical axis will intersect the sample surface at an angle substantially normal to the sample surface, the extraction direction will be substantially normal to the sample surface, the extraction direction will be substantially parallel to the first ion optical axis, and sample ions will be extracted along the first ion optical axis.

In various embodiments, the aperture in the first-electrode is substantially centered on the sample being irradiated by moving the sample holder 808. In some embodiments, the sample holder 808 is held by a sample holder receiving stage 828 capable of one-axis translational motion, x-y (2 axis) translational motion, or x-y-z (3 axis) translational motion to position a sample for irradiation.

In various embodiments of operation, a potential difference is applied between the sample surface 806 and the first apertured electrode 820 to accelerate the sample ions in an extraction direction that is within 5 degrees or less of the normal of the sample surface. In some embodiments, the ion source is configured and operates to accelerate sample ions in an extraction direction 832 that is substantially normal to the sample surface. A first ion deflector 830 is positioned between the second apertured electrode 822 and the third apertured electrode 826 to deflect sample ions in a direction different from the extraction direction and onto a second ion optical axis 834.

In various embodiments, a fourth apertured electrode 836 is positioned between the third electrode 826 and a mass analyzer 840 to facilitate directing sample ions into the mass analyzer 840. In various embodiments, the system includes a second ion deflector 844 positioned to facilitate directing sample ions into the mass analyzer 840. In various embodiments, the second ion deflector 844 is positioned between a fourth electrode 836 and the mass analyzer 840. In various embodiments, the second ion deflector 844 is positioned to deflect sample ions in a direction different from the second ion optical axis 834 and onto a third ion optical axis 846.

In some embodiments, the entrance 848 to the mass analyzer 840, and any associated fourth electrode 836, second ion deflector 844, or both, are positioned a distance L off of the first ion optical axis 824 such that neutral molecules traveling from the sample holder along the extraction direction do not substantially collide with the entrance 848 to the mass analyzer or any associated fourth electrode 836. In various embodiments, the distance L is at least $L_{min}$ as given by equation (1), where examples of the distance z and half-angle δ of the neutral beam cone are illustrated in FIG. 8.

In various embodiments, MALDI ion sources and mass analyzer systems include a temperature-controlled surface 850 disposed about at least a portion of the ion optics system, and a heater system 852 connected at least to the first electrode 820 and capable of heating the first electrode. In some embodiments, the heater system 852 is connected to all the ion optics system elements about which the temperature-controlled surface 850 is disposed, the ion optic system elements in the path of the neutral beam, or both. In various embodiments, the heater system 852 is connected to the first electrode 820, the second electrode 822, the third electrode 826, and the first ion deflector 830.

In various embodiments, the heater system 852 is used to raise the temperature of the first electrode and second electrode to decrease the probability that neutral molecules in the plume will stick to them. In various embodiments, a temperature-controlled surface 850 is held at a temperature lower than that of the first electrode and that of the second electrode is used to capture neutral molecules and prevent their deposition on other surfaces. In some embodiments, the first electrode 820 and second electrode 822 are heated such that matrix molecules do not substantially stick to them. In various embodiments, the third electrode 826 is heated such that matrix molecules do not substantially stick to it and the temperature-controlled surface 850 is held at a temperature lower than that of the third electrode. In various embodiments, the first ion deflector 830 is heated such that matrix molecules do not substantially stick to it.

In various embodiments, the first electrode 820 and second electrode 822 in the ion source are heated periodically to a temperature sufficient to vaporize deposits on the electrodes. In various embodiments, a blank is substituted for the MALDI sample holder so that the deposits formed, for example, on the first electrode can be redeposited on the blank, temperature-controlled surface, or both. In various embodiments, the third electrode 826 is heated periodically to a temperature sufficient to vaporize deposits on the electrodes and a blank is substituted for the MALDI sample holder so that the deposits formed, for example, on the third electrode can be redeposited on the blank, temperature-controlled surface, or both. In various embodiments, the first ion deflector 830 is heated periodically to a temperature sufficient to vaporize deposits on the electrodes and a blank is substituted for the MALDI sample holder so that the deposits formed, for example, on the first ion deflector can be redeposited on the blank, temperature-controlled surface, or both.

A wide variety of mass analyzers may be used with the MALDI ion sources and in the mass analyzer systems of the invention. The mass analyzer can be a single mass spectrometric instrument or multiple mass spectrometric instruments, employing, for example, tandem mass spectrometry (often referred to as MS/MS) or multidimensional mass spectrometry (often referred to as $MS^n$). Suitable mass spectrometers, include, but are not limited to, time-of-flight (TOF) mass spectrometers, quadrupole mass spectrometers (QMS), and ion mobility spectrometers (IMS). Suitable mass analyzers systems can also include ion reflectors and/or ion fragmentors.

Examples of suitable ion fragmentors include, but are not limited to, collision cells (in which ions are fragmented by causing them to collide with neutral gas molecules), photo-dissociation cells (in which ions are fragmented by irradiating them with a beam of photons), and surface dissociation fragmentors (in which ions are fragmented by colliding them with a solid or a liquid surface).

In various embodiments, the mass analyzer comprises a triple quadrupole mass spectrometer for selecting a primary ion and/or detecting and analyzing fragment ions thereof. In various embodiments, the first quadrupole selects the primary ion. The second quadrupole is maintained at a sufficiently high pressure and voltage so that multiple low energy collisions occur causing some of the ions to fragment. The third quadrupole is scanned to analyze the fragment ion spectrum.

In various embodiments, the mass analyzer comprises two quadrupole mass filters and a TOF mass spectrometer for selecting a primary ion and/or detecting and analyzing fragment ions thereof. In various embodiments, the first quadrupole selects the primary ion. The second quadrupole is maintained at a sufficiently high pressure and voltage so that multiple low energy collisions occur causing some of the ions to fragment, and the TOF mass spectrometer detects and analyzes the fragment ion spectrum.

In various embodiments, the mass analyzer comprises two TOF mass analyzers and an ion fragmentor (such as, for example, CID or SID). In various embodiments, the first TOF selects the primary ion for introduction in the ion fragmentor and the second TOF mass spectrometer detects and analyzes the fragment ion spectrum. The TOF analyzers can be linear or reflecting analyzers.

In various embodiments, the mass analyzer comprises a time-of-flight mass spectrometer and an ion reflector. The ion reflector is positioned at the end of a field-free drift region of the TOF and is used to compensate for the effects of the initial kinetic energy distribution by modifying the flight path of the ions. In various embodiments, the ion reflector consists of a series of rings biased with potentials that increase to a level slightly greater than an accelerating voltage. In operation, as the ions penetrate the reflector they are decelerated until their velocity in the direction of the field becomes zero. At the zero velocity point, the ions reverse direction and are accelerated back through the reflector. The ions exit the reflector with energies identical to their incoming energy but with velocities in the opposite direction. Ions with larger energies penetrate the reflector more deeply and consequently will remain in the reflector for a longer time. The potentials used in the reflector are selected to modify the flight paths of the ions such that ions of like mass and charge arrive at a detector at substantially the same time.

In various embodiments, the mass analyzer comprises a tandem MS—MS instrument comprising a first field-free drift region having a timed ion selector to select a primary sample ion of interest, a fragmentation chamber (or ion fragmentor) to produce sample ion fragments, a mass analyzer to analyze the fragment ions. In various embodiments, the timed ion selector comprises a pulsed ion deflector. In various embodiments, the second ion deflector can be used as a pulsed ion deflector in versions of this tandem MS/MS instrument. In various embodiments of operation, the pulsed ion deflector allows only those ions within a selected mass-to-charge ratio range to be transmitted to the ion fragmentation chamber. In various embodiments, the mass analyzer is a time-of-flight mass spectrometer. The mass analyzer can include an ion reflector. In various embodiments, the fragmentation chamber is a collision cell designed to cause fragmentation of ions and to delay extraction. In various embodiments, the fragmentation chamber can also serve as a delayed extraction ion source for the analysis of the fragment ions by time-of-flight mass spectrometry.

In various embodiments, the mass analyzer comprises a tandem TOF-MS having a first, a second, and a third TOF mass separator positioned along a path of the plurality of ions generated by the pulsed ion source. The first mass separator is positioned to receive the plurality of ions generated by the pulsed ion source. The first mass separator accelerates the plurality of ions generated by the pulsed ion source, separates the plurality of ions according to their mass-to-charge ratio, and selects a first group of ions based on their mass-to-charge ratio from the plurality of ions. The first mass separator also fragments at least a portion of the first group of ions. The second mass separator is positioned to receive the first group of ions and fragments thereof generated by the first mass separator. The second mass separator accelerates the first group of ions and fragments thereof, separates the first group of ions and fragments thereof according to their mass-to-charge ratio, and selects from the first group of ions and fragments thereof a second group of ions based on their mass-to-charge ratio. The second mass separator also fragments at least a portion of the second group of ions. The first and/or the second mass separator may also include an ion guide, an ion-focusing element, and/or an ion-steering element. In various embodiments, the second TOF mass separator decelerates the first group of ions and fragments thereof. In various embodiments, the second TOF mass separator includes a field-free region and an ion selector that selects ions having a mass-to-charge ratio that is substantially within a second predetermined range. In various embodiments, at least one of the first and the second TOF mass separator includes a timed-ion-selector that selects fragmented ions. In various embodiments, at least one of the first and the second mass separator includes an ion fragmentor. The third mass separator is positioned to receive the second group of ions and fragments thereof generated by the second mass separator. The third mass separator accelerates the second group of ions and fragments thereof and separates the second group of ions and fragments thereof according to their mass-to-charge ratio. In various embodiments, the third mass separator accelerates the second group of ions and fragments thereof using pulsed acceleration. In various embodiments, an ion detector positioned to receive the second group of ions and fragments thereof. In various embodiments, an ion reflector is positioned in a field-free region to correct the energy of at least one of the first or second group of ions and fragments thereof before they reach the ion detector.

In various embodiments, the mass analyzer comprises a TOF mass analyzer having multiple flight paths, multiple modes of operation that can be performed simultaneously in time, or both. This TOF mass analyzer includes a path selecting ion deflector that directs ions selected from a packet of sample ions entering the mass analyzer along either a first ion path, a second ion path, or a third ion path. In some embodiments, even more ion paths may be employed. In various embodiments, the second ion deflector can be used as a path selecting ion deflector. A time-dependent voltage is applied to the path selecting ion deflector to select among the available ion paths and to allow ions having a mass-to-charge ratio within a predetermined mass-to-charge ratio range to propagate along a selected ion path.

For example, in various embodiments of operation of a TOF mass analyzer having multiple flight paths, a first predetermined voltage is applied to the path selecting ion deflector for a first predetermined time interval that corresponds to a first predetermined mass-to-charge ratio range, thereby causing ions within first mass-to-charge ratio range to propagate along the first ion path. In various embodiments, this first predetermined voltage is zero allowing the ions to continue to propagate along the initial path. A second predetermined voltage is applied to the path selecting ion deflector for a second predetermined time range corresponding to a second predetermined mass-to-charge ratio range thereby causing ions within the second mass-to-charge ratio range to propagate along the second ion path. Additional time ranges and voltages including a third, fourth etc. can be employed to accommodate as many ion paths as are required for a particular measurement. The amplitude and polarity of the first predetermined voltage is chosen to deflect ions into the first ion path, and the amplitude and polarity of the second predetermined voltage is chosen to deflect ions into the second ion path. The first time interval is chosen to correspond to the time during which ions within the first predetermined mass-to-charge ratio range are propagating through the path selecting ion deflector and the second time interval is chosen to correspond to the time during which ions within the second predetermined mass-to-charge ratio range are propagating through the path selecting ion deflector. A first TOF mass separator is positioned to receive the packet of ions within the first mass-to-charge ratio range propagating along the first ion path. The first TOF mass separator separates ions within the first mass-to-charge ratio range according to their masses. A first detector is positioned to receive the first group of ions that are propagating along the first ion path. A second TOF mass separator is positioned to receive the portion of the packet of ions propagating along the second ion path. The second TOF mass separator separates ions within the second mass-to-charge ratio range according to their masses. A second detector is positioned to receive the second group of ions that are propagating along the second ion path. In some embodiments, additional mass separators and detectors including a third, fourth, etc. may be positioned to receive ions directed along the corresponding path. In one embodiment, a third ion path is employed that discards ions within the third predetermined mass range. The first and second mass separators can be any type of mass separator. For example, at least one of the first and the second mass separator can include a field-free drift region, an ion accelerator, an ion fragmentor, or a timed ion selector. The first and second mass separators can also include multiple mass separation devices. In various embodiments, an ion reflector is included and positioned to receive the first group of ions, whereby the ion reflector improves the resolving power of the TOF mass analyzer for the first group of ions. In various embodiments, an ion reflector is included and positioned to receive the second group of ions, whereby the ion reflector improves the resolving power of the TOF mass analyzer for the second group of ions.

Figure 9A:
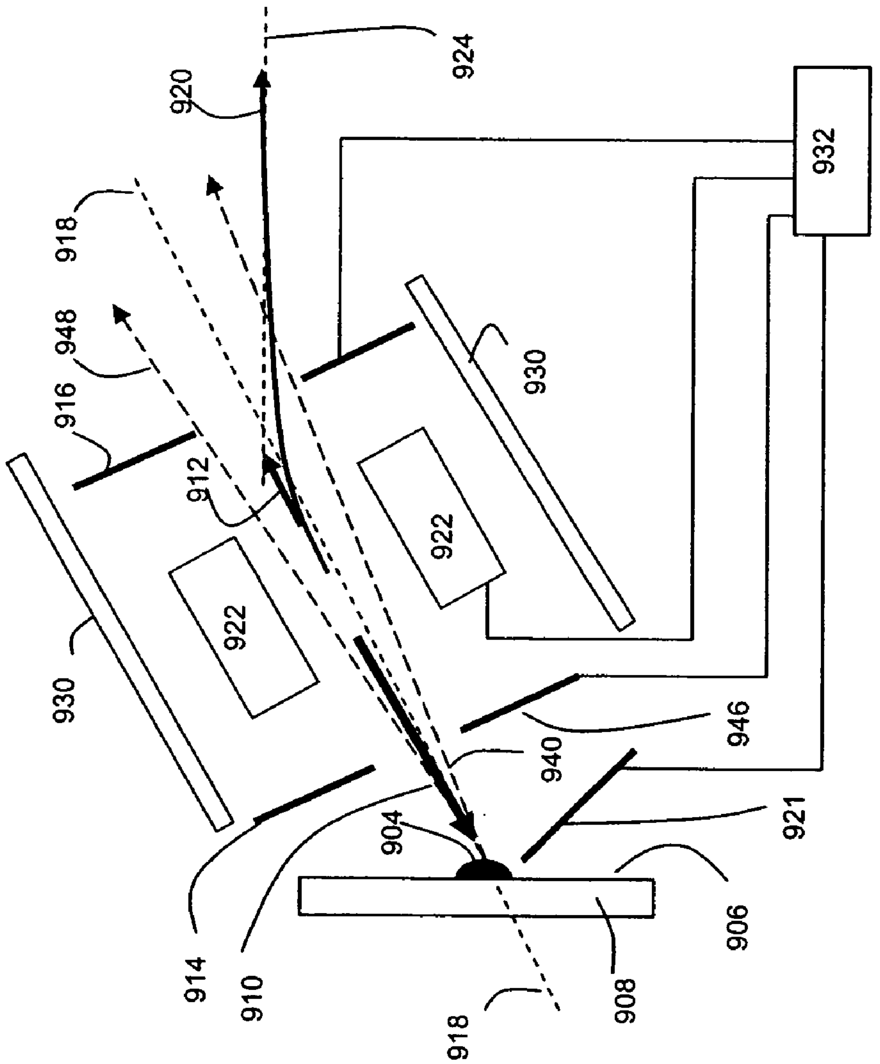
FIGS. 9A–9B schematically illustrate a MALDI ion source in accordance with various embodiments.
Figure 9B:
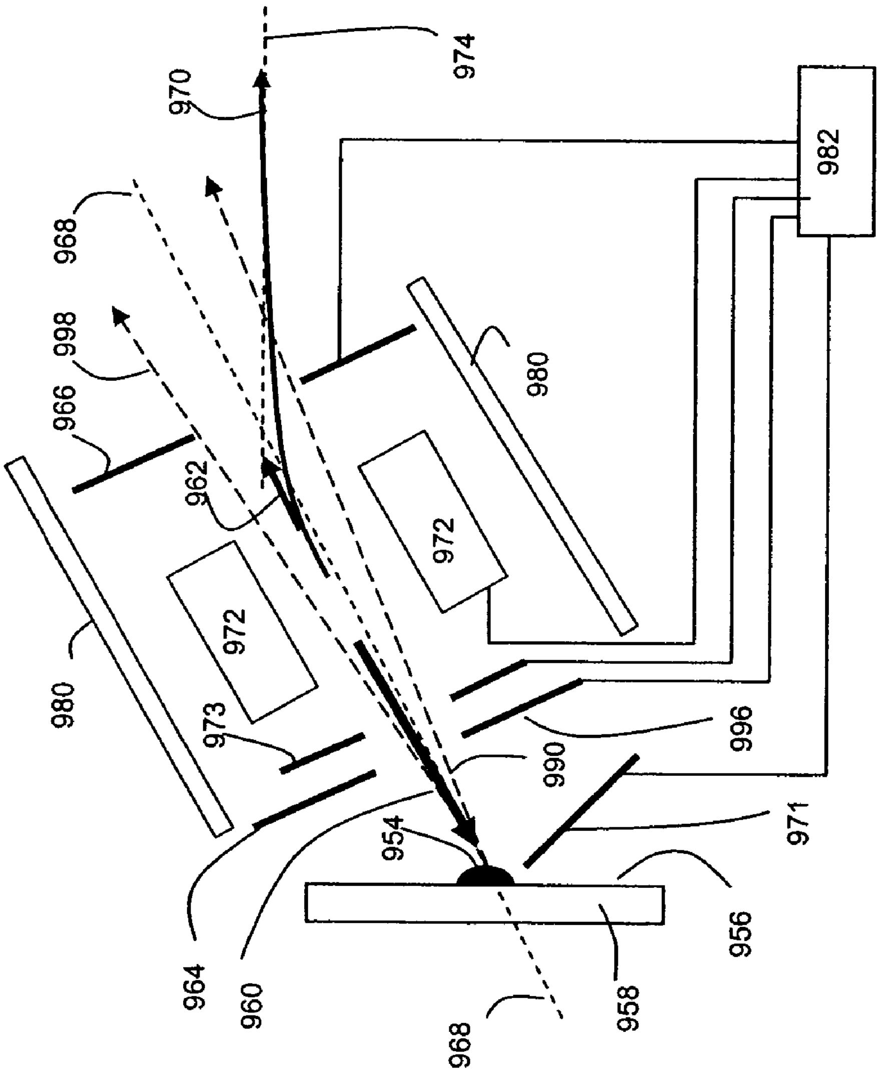

FIGS. 9A and 9B depict various embodiments of a MALDI ion source having substantially coaxial sample irradiation and ion extraction. In various embodiments, the MALDI ion source includes an optical system configured to irradiate a sample 904, 950 on the sample surface 906, 956 of a sample holder 908, 958 with a pulse of laser energy 910, where the Poynting vector of the pulse of energy intersecting the sample surface is substantially coaxial with the extraction direction 912, 962 along a first ion optical axis.

In various embodiments, the ion optics system comprises a first electrode 914, 964 and a second electrode 916, 966. In some embodiments both the first and second electrodes have an aperture and the line between the centers of the apertures defines a first ion optical axis 918, 968. In various embodiments, the first ion optical axis intersects the sample surface at an angle between about 5 degrees and about 50 degrees with respect to the normal to the sample surface. A potential difference is applied between the sample surface and the first electrode to accelerate sample ions of given charge sign (i.e., either positive or negative) in a direction away from the sample surface and sample ions are extracted to form an ion beam 920, 970. In various embodiments, the ion optics system includes a first ion deflector 922, 972 positioned to deflect sample ions. In some embodiments, a supplemental electrode 921, 971 is provided, for example, to facilitate sample ion extraction along the first ion optical axis. The supplemental electrode 921, 971 can be positioned such that the angle between the first ion optical axis 918, 968 and the surface of the supplemental electrode 921, 971 facing the first electrode 914, 964 is substantially the same as the angle between the first ion optical axis 918, 968 and the sample surface 906, 956. A variety of first and second electrode shapes and configurations can be used that are substantially symmetric about the extraction direction such as, but not limited to, plates, grids, and cones. In addition a variety of supplemental electrode shapes can be used including, but not limited to, plates, grids, and cones.

Referring to FIG. 9A, in various embodiments, the first ion deflector 922 is positioned between the first electrode 914 and the second electrode 916 to deflect sample ions in a direction different from the extraction direction 912 and onto a second ion optical axis 924. Referring to FIG. 9B, in various embodiments, the first ion deflector 972 is positioned between the second electrode 966 and a third electrode 973 to deflect sample ions in a direction different from the extraction direction 962 and onto a second ion optical axis 974.

In various embodiments, the MALDI ion source includes a temperature-controlled surface 930, 980 disposed about at least a portion of the ion optics system, and a heater system 932, 982 connected at least to the first electrode 916, 966 and capable of heating the first electrode. In some embodiments, the heater system 932, 982 is connected to all the ion optics system elements about which the temperature-controlled surface 930, 980 is disposed, the ion optic system elements in the path of the neutral beam, or both. In various embodiments, the heater system 932, 982 is connected to the first electrode 914, 964, the second electrode 916, 966, and the first ion deflector 922, 972.

In various embodiments, a pulse of laser energy 910, 960 strikes a sample 904, 954 and produces a plume of neutral molecules 940, 990 and ions. A portion of this neutral plume or beam passes through the aperture in the first apertured electrode 914, 964 and a portion strike the sample side surface 946, 996 of the first apertured electrode 914, 964. A portion of this neutral plume or beam 948, 998 passes through the aperture in a last electrode. The size of the aperture in the second electrode and the distance between the last electrode and the sample surface determines the half-angle of the cone of the neutral beam 948, 998 that travels beyond the last electrode.

In various embodiments, a heater system 932, 982 is used to raise the temperature of the first electrode and second electrode to decrease the probability that neutral molecules in the plume will stick to them. In various embodiments, a temperature-controlled surface 930, 980 is held at a temperature lower than that of the first electrode and that of the second electrode is used to capture neutral molecules and prevent their deposition on other surfaces. In some embodiments, the first electrode and second electrode are heated such that matrix molecules do not substantially stick to them. In various embodiments, the first ion deflector is heated such that matrix molecules do not substantially stick to it.

In various embodiments, the first and second electrodes in the ion source are heated periodically to a temperature sufficient to vaporize deposits on the electrodes. In various embodiments, a blank is substituted for the MALDI sample holder so that the deposits formed, for example, on the first electrode can be redeposited on the blank. In various embodiments, the first ion deflector is heated periodically to a temperature sufficient to vaporize deposits on the electrodes and a blank is substituted for the MALDI sample holder so that the deposits formed, for example, on the first ion deflector can be redeposited on the blank.

Figure 10:
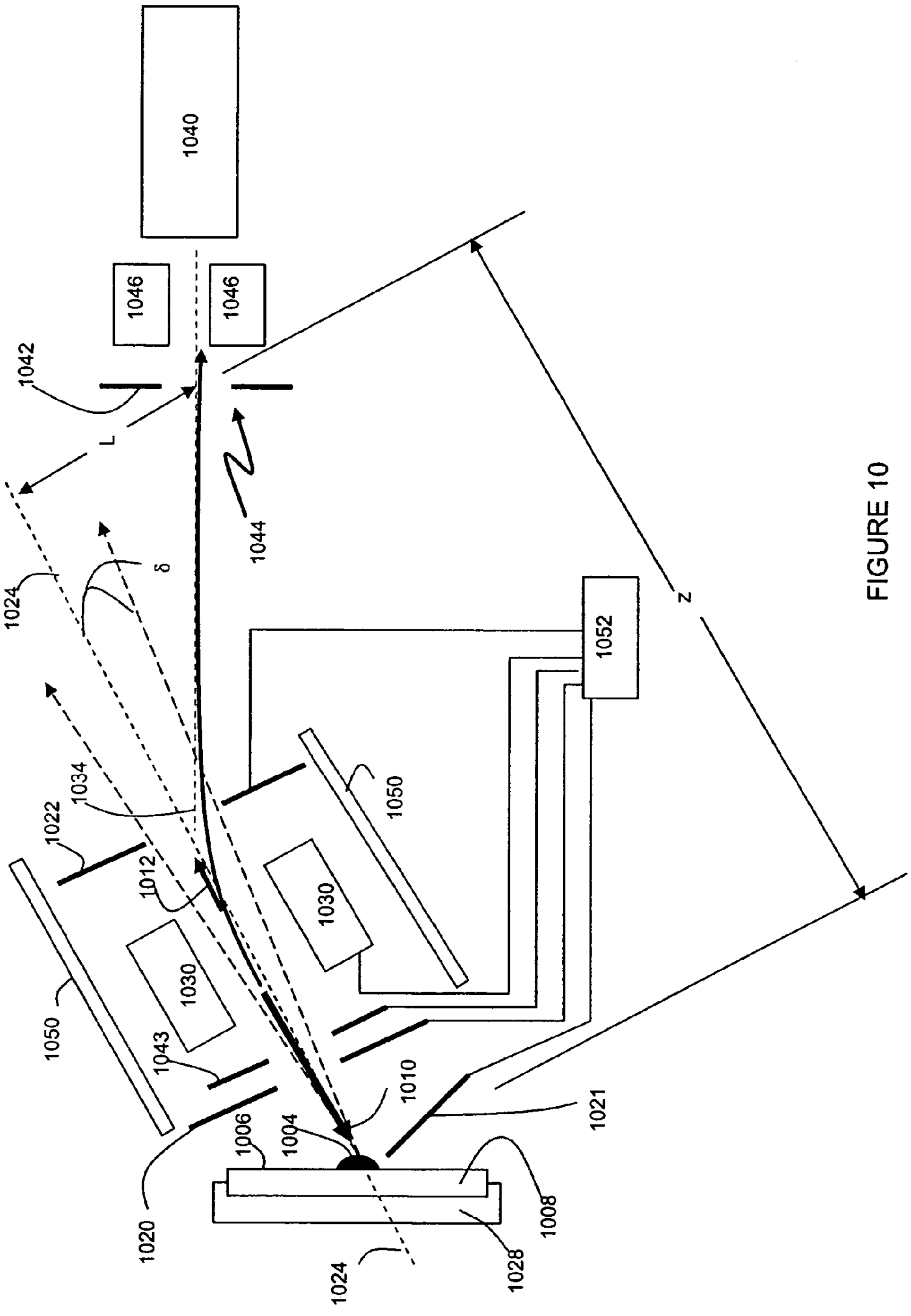
FIG. 10 schematically illustrates a MALDI ion source and mass analyzer system in accordance with various embodiments.

Referring to FIG. 10, various embodiments of a MALDI sources and mass analyzer system are depicted. In one embodiment, the MALDI ion source includes an optical system configured to irradiate a sample 1004 on the sample surface 1006 of a sample holder 1008 with a pulse of laser energy 1010, where the Poynting vector of the pulse of energy intersecting the sample surface is substantially coaxial with the extraction direction 1012 along a first ion optical axis.

The ion optics system includes a first apertured electrode 1020 and a second apertured electrode 1022. The line between the center of the aperture in the first electrode and the center of the aperture in the second electrode defines the first ion optical axis 1024. In some embodiments, the first electrode 1020 and second electrode are substantially planar plates or grids positioned substantially to each other. In various embodiments, the ion optics system that is configured to extract sample ions in a direction which forms an angle in the range between about 5 degrees and 50 degrees of the normal to the sample surface. In some embodiments, a supplemental electrode 1021 is provided, for example, to facilitate sample ion extraction along the first ion optical axis. The supplemental electrode 1021 can be positioned such that the angle between the first ion optical axis 1024 and the surface of the supplemental electrode 1021 facing the first electrode 1020 is substantially the same as the angle between the first ion optical axis 1024 and the sample surface 1006. A variety of first and second electrode shapes and configurations can be used that are substantially symmetric about the extraction direction 1012 such as, but not limited to, plates, grids, and cones. In addition a variety of supplemental electrode shapes can be used including, but not limited to, plates, grids, and cones.

In various embodiments, the aperture in the first electrode is substantially centered on the sample being irradiated by moving the sample holder 1008. In some embodiments, the sample holder 1008 is held by a sample holder receiving stage 1028 capable of one-axis translational motion, x-y (2 axis) translational motion, or x-y-z (3 axis) translational motion to position a sample for irradiation.

In various embodiments of operation, a potential difference is applied between the sample surface 1006 and the first apertured electrode 1020 to accelerate the sample ions in an extraction direction 1012 that is substantially coaxial with the Poynting vector of the pulse of energy 1010 intersecting the sample surface. In some embodiments, the ion source is configured and operates to accelerate sample ions in an extraction direction that is substantially normal to the sample surface. A first ion deflector 1030 is positioned between the first apertured electrode 1020 and the second apertured electrode 1022 to deflect sample ions in a direction different from the extraction direction 1012 and onto a second ion optical axis 1034, and a mass analyzer 1040 is positioned on the second ion optical axis 1034 to receive sample ions. In various embodiments, a third apertured electrode 1042 is positioned between the second electrode 1022 and the mass analyzer 1040 to facilitate directing sample ions into the mass analyzer 1040. In various embodiments, the MALDI ion source includes an apertured electrode 1043 positioned between the first apertured electrode 1020 and the first ion deflector 1030.

In various embodiments, the system includes a second ion deflector 1046 positioned to facilitate directing sample ions into the mass analyzer 1040. In various embodiments, the second ion deflector 1046 is positioned between the third electrode 1042 and the mass analyzer 1040. In various embodiments, the second ion deflector 1046 is positioned to deflect sample ions in a direction different from the second ion optical axis 1034 and onto a third ion optical axis.

In some embodiments, the entrance 1044 to the mass analyzer 1040, and any associated third electrode 1042, are positioned a distance L off of the first ion optical axis 1024 such that neutral molecules traveling from the sample holder along the extraction direction do not substantially collide with the entrance 1044 to the mass analyzer or any associated third electrode 1042. In various embodiments, the distance L is at least $L_{min}$ as given by equation (1), where examples of the distance z and half-angle δ of the neutral beam cone are illustrated in FIG. 10.

In various embodiments, MALDI ion sources and mass analyzer systems include a temperature-controlled surface 1050 disposed about at least a portion of the ion optics system, and a heater system 1052 connected at least to the first electrode 1020 and capable of heating the first electrode. In some embodiments, the heater system 1052 is connected to all the ion optics system elements about which the temperature-controlled surface 1050 is disposed, the ion optic system elements in the path of the neutral beam, or both. In various embodiments, the heater system 1052 is connected to the first electrode 1020, the second electrode 1022, and the first ion deflector 1030.

In various embodiments, the heater system 1052 is used to raise the temperature of the first electrode and second electrode to decrease the probability that neutral molecules in the plume will stick to them. In various embodiments, a temperature-controlled surface 1050 is held at a temperature lower than that of the first electrode and that of the second electrode is used to capture neutral molecules and prevent their deposition on other surfaces. In some embodiments, the first electrode 1020 and second electrode 1022 are heated such that matrix molecules do not substantially stick to them. In various embodiments, the first ion deflector 1030 is heated such that matrix molecules do not substantially stick to it.

In various embodiments, the first electrode 1020 and second electrode 1022 in the ion source are heated periodically to a temperature sufficient to vaporize deposits on the electrodes. In various embodiments, a blank is substituted for the MALDI sample holder so that the deposits formed, for example, on the first electrode can be redeposited on the blank, temperature-controlled surface, or both. In various embodiments, the first ion deflector 1030 is heated periodically to a temperature sufficient to vaporize deposits on the electrodes and a blank is substituted for the MALDI sample holder so that the deposits formed, for example, on the first ion deflector can be redeposited on the blank, temperature-controlled surface, or both.

Figure 11A:
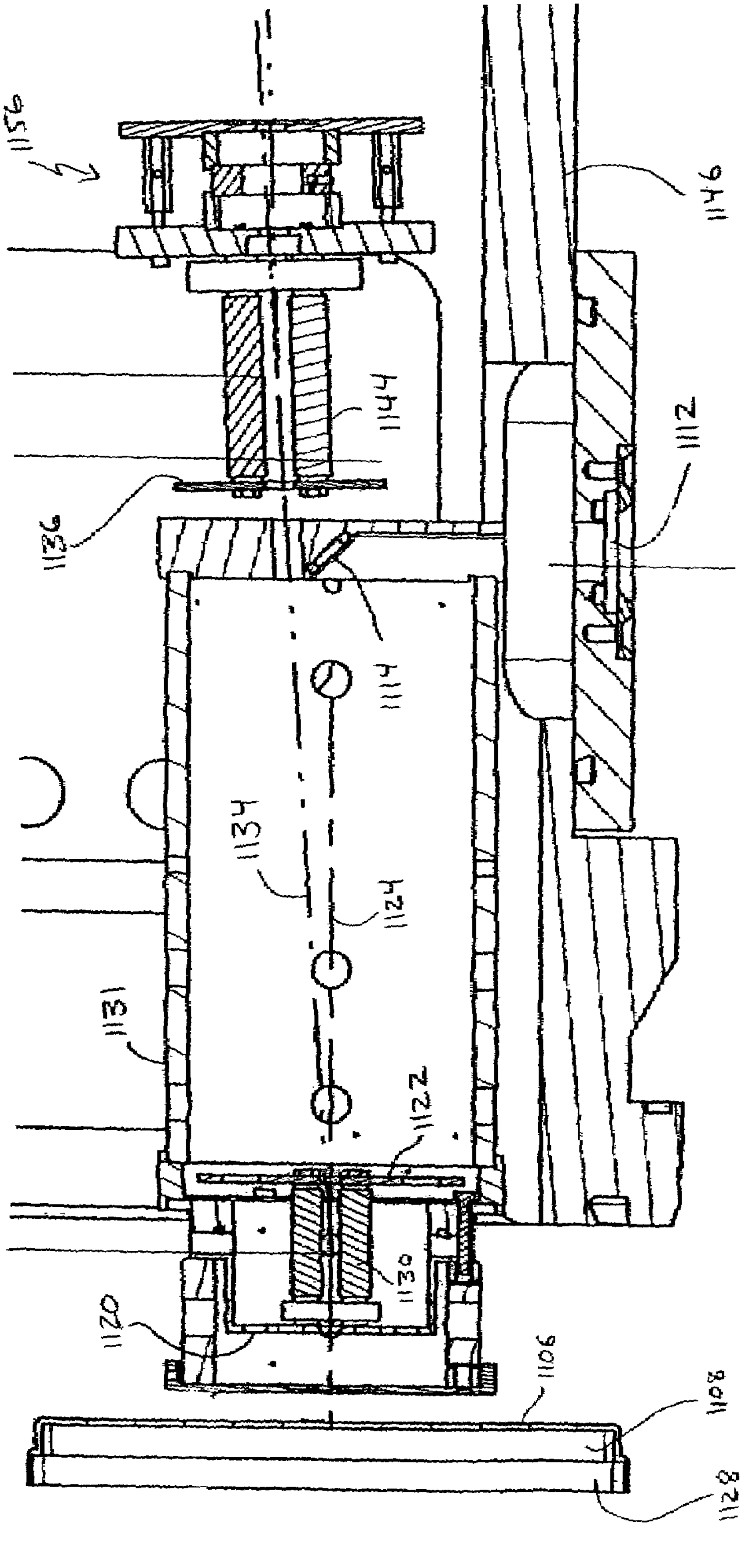
FIGS. 11A–11B schematically illustrate in cross-section a MALDI ion source and mass analyzer system in accordance with various embodiments.
Figure 11B:
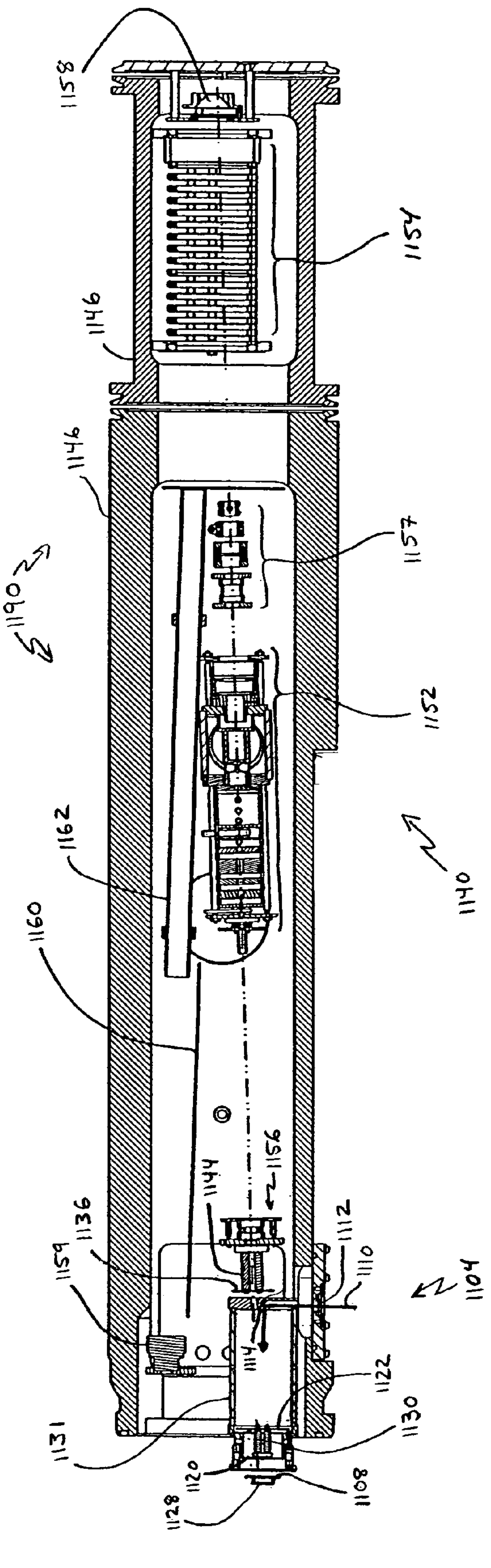

Referring to FIGS. 11A and 11B, various embodiments of MALDI ion sources and mass analyzer systems are depicted; where FIG. 11A is an enlargement of the MALDI ion source region depicted in FIG. 11B. In one embodiment, the MALDI ion source 1104 includes an optical system configured to irradiate a sample on the sample surface 1106 of a sample holder 1108 with a pulse of laser energy 1110 at angle substantially normal to the sample surface. In various embodiments, the optical system can comprise a window 1112 and a prism or mirror 1114 to direct the pulse of laser energy onto the sample.

In various embodiments, the MALDI ion source includes an ion optics system that is configured to extract sample ions in a direction substantially normal to the sample surface. In FIGS. 11A–11B, the ion optics system includes a first apertured electrode 1120 and a second apertured electrode 1122. The line between the center of the aperture in the first electrode and the center of the aperture in the second electrode can be used to define a first ion optical axis 1124. In various embodiments, the ion optics system includes a third apertured electrode. In some embodiments, the first, second and third electrodes are substantially planar plates or grids positioned substantially parallel to the sample surface and each other.

In various embodiments, the aperture in the first electrode is substantially centered on the sample being irradiated by moving the sample holder 1108. In some embodiments, the sample holder 1108 is held by a sample holder receiving stage 1128 capable of one-axis translational motion, x-y (2 axis) translational motion, or x-y-z (3 axis) translational motion to position a sample for irradiation.

In various embodiments of operation, a potential difference is applied between the sample surface and the first apertured electrode 1120 to accelerate the sample ions in an extraction direction that is within 5 degrees or less of the normal of the sample surface. In some embodiments, the ion source is configured and operates to accelerate sample ions in an extraction direction that is substantially normal to the sample surface. In various embodiments, a first ion deflector 1130 is positioned between the first apertured electrode 1120 and the second apertured electrode 1122 to deflect sample ions in a direction different from the extraction direction and onto a second ion optical axis 1134. A tube or other suitable structure 1131 can be used, for example, to shield the sample ions from stray electrical fields, maintain electrical field uniformity, or both, after deflection. In various embodiments, such a structure 1131 can serve as a temperature-controlled surface disposed about at least a portion of the ion optics system, can be connected to a heater system, or both.

In various embodiments, an apertured electrode 1136 is positioned between the first ion deflector 1130 and a mass analyzer 1140 to facilitate directing sample ions into the mass analyzer 1140. In various embodiments, the system includes a second ion deflector 1144 positioned to facilitate directing sample ions into the mass analyzer 1140. In various embodiments, the second ion deflector 1144 is positioned between a fourth electrode and the mass analyzer 1140. In various embodiments, the second ion deflector 1144 is positioned to deflect sample ions in a direction different from the second ion optical axis and onto a third ion optical axis.

In some embodiments, the entrance to the mass analyzer 1140, and any associated entrance electrodes, second ion deflector, or both, are positioned a distance L off of the first ion optical axis such that neutral molecules traveling from the sample holder along the extraction direction do not substantially collide with the entrance to the mass analyzer. In various embodiments, the distance L is at least $L_{min}$ as given by equation (1).

The mass analyzer 1140 can be a single mass spectrometric instrument or multiple mass spectrometric instruments. The mass analyzer can be contained in one or more chambers 1146, which can also contain all or a part of the MALDI ion source. In various embodiments, the mass analyzer 1140 includes a tandem mass spectrometer 1152 (often referred to as a MS/MS) and an ion reflector 1154, various ion optics 1156, 1157, and one or more detectors 1158, 1159. In some embodiments, one or more structures 1160, 1162 are provided, for example, to shield the sample ions from stray electrical fields, maintain electrical field uniformity, or both, as they travel from the ion reflector 1154 to a detector 1159.

In various embodiments, the mass analyzer system 1190 includes a temperature-controlled surface disposed about at least a portion of the ion optics system, and a heater system connected at least to the first electrode and capable of heating the first electrode. In some embodiments, the heater system is connected to all the ion optics system elements about which the temperature-controlled surface is disposed, the ion optic system elements in the path of the neutral beam, or both. In various embodiments, the heater system is connected to the first electrode, the second electrode, the third electrode, and the first ion deflector.

In various embodiments, the heater system is used to raise the temperature of the first electrode and second electrode to decrease the probability that neutral molecules in the plume will stick to them. In various embodiments, a temperature-controlled surface is held at a temperature lower than that of the first electrode and that of the second electrode is used to capture neutral molecules and prevent their deposition on other surfaces. In some embodiments, the first electrode and second electrode are heated such that matrix molecules do not substantially stick to them. In various embodiments, the third electrode is heated such that matrix molecules do not substantially stick to it and the temperature-controlled surface is held at a temperature lower than that of the third electrode. In various embodiments, the first ion deflector is heated such that matrix molecules do not substantially stick to it.

In various embodiments, the first electrode and second electrode in the ion source are heated periodically to a temperature sufficient to vaporize deposits on the electrodes. In various embodiments, a blank is substituted for the MALDI sample holder so that the deposits formed, for example, on the first electrode can be redeposited on the blank, temperature-controlled surface, or both. In various embodiments, the third electrode is heated periodically to a temperature sufficient to vaporize deposits on the electrodes and a blank is substituted for the MALDI sample holder so that the deposits formed, for example, on the third electrode can be redeposited on the blank, temperature-controlled surface, or both. In various embodiments, the first ion deflector, the second ion deflector, or both are heated periodically to a temperature sufficient to vaporize deposits on the electrodes and a blank is substituted for the MALDI sample holder so that the deposits formed, for example, on the first ion deflector can be redeposited on the blank, temperature-controlled surface, or both.

In various aspects, methods for providing sample ions for mass analysis are provided. The methods form ions using matrix-assisted laser desorption/ionization (MALDI). In various embodiments, the methods provide a sample surface having a sample disposed thereon and irradiate the sample with a pulse of laser energy at an irradiation angle that is at least within 10 degrees of the normal to the sample surface to form sample ions by MALDI. The sample ions are then extracted in an extraction direction that is within 5 degrees or less of the normal to the sample surface. Sample ions can be extracted, for example, using an accelerating electrical field provided, for example, by an ion optics system.

In various embodiments, the step of irradiating the sample is conducted such that sample is irradiated with a pulse of laser energy at an irradiation angle that is within 5 degrees or less of the normal of the sample surface; and/or within 1 degree or less of the normal of the sample surface. Accordingly, it is to be understood that in some embodiments the irradiation angle is substantially normal to the sample surface at the point of irradiation.

In various embodiments, the step of extracting sample ions is conducted such that sample ions are then extracted in an extraction direction that is within 1 degree or less of the normal of the sample surface. Accordingly, it is to be understood that in some embodiments the extraction direction is substantially normal to the sample surface.

In various embodiments, the methods of providing sample ions for mass analysis can also include one or more of the steps of: deflecting the sample ions in a second direction different from the extraction direction; deflecting the sample ions in a third direction different from the second direction; and focusing the sample ions into a mass analyzer.

In various embodiments, the methods of providing sample ions for mass analysis can also include steps to clean one or more elements in the ion optics system by heating one or more elements. In various embodiments, the methods also include one or more of the steps of replacing the sample surface with a blank; heating one or more elements of the ion optics system to vaporize matrix molecules deposited thereon; collecting at least a portion of the vaporized matrix molecules on the blank; and removing the blank. In various embodiments, the methods produce sample ions by MALDI and extracting sample ions using an accelerating electrical field to form an ion beam where the angle of the trajectory at the exit from the accelerating electrical field of sample ions substantially at the center of the ion beam is substantially independent of sample ion mass.

In various embodiments, sample ions are produced by aligning the pulse of energy with an extraction direction that is substantially normal to the sample surface, irradiating a sample with a pulse of laser energy at an irradiation angle that is substantially normal to the sample surface and extracting the sample ions in extraction direction that is substantially normal to the sample surface.

In various embodiments, the methods of providing sample ions for mass analysis can also include one or more of the steps of: deflecting the sample ions in a second direction different from the extraction direction; deflecting the sample ions in a third direction different from the second direction; and focusing the sample ions into a mass analyzer.

In various embodiments, the methods of providing sample ions for mass analysis can also include steps to clean one or more elements in the ion optics system by heating one or more elements. In various embodiments, the methods also include one or more of the steps of replacing the sample surface with a blank; heating one or more elements of the ion optics system to vaporize matrix molecules deposited thereon; collecting at least a portion of the vaporized matrix molecules on the blank; and removing the blank.

In various embodiments, the MALDI ion sources and mass analyzer systems include structures for delayed extraction operation of the ion source. In some embodiments, delayed extraction is performed to provide time-lag focusing to correct for the initial sample ion velocity distribution.

In various embodiments, the MALDI ion sources and mass analyzer systems include a power source electrically coupled to the sample surface of the sample holder, the first electrode and the second electrode. An insulating layer can be interposed between the sample and sample surface. The power source can comprise, for example, multiple power supplies or a single power supply with two or more outputs. The power source can be, for example, manually controlled, electronically controlled, and/or programmable.

In various embodiments of operation, the sample is irradiated with a pulse of laser energy at an irradiation angle to produce sample ions by MALDI. After any previous sample ion extraction and during the irradiation of the sample with the pulse of laser energy, the power source applies a first variable potential to the sample holder, a second variable potential to the first electrode and a third variable potential to the second electrode to establish a first electrical field at a first predetermined time relative to the generation of the pulse of energy. The two or more of the first, second and third variable potentials can be substantially equal. The two or more of the first, second and third variable potentials can be substantially equal to ground. In some embodiments, the first variable potential is more negative than the second variable potential When measuring positive sample ions, and the first variable potential is less negative than the second variable potential when measuring negative sample ions, to thereby produce a retarding electrical field prior to sample ion extraction.

At a second predetermined time subsequent to the generation of the pulse of laser energy, the power source applies a fourth variable potential to at least one of the sample holder and the first electrode to establish a second electrical field that accelerates sample ions away from the sample holder to extract the sample ions.

A wide variety of structures can be used to control the timing of the generation of the fourth variable potential. For example, a photodetector can be used to detect the pulse of laser energy and generate an electrical signal synchronously timed to the pulse of energy. A delay generator with an input responsive to the synchronously timed signal can be used to provide an output electrical signal, delayed by a predetermined time with respect to the synchronously timed signal, for the power source to trigger or control the application of the various first, second, third and fourth variable potentials.

EXAMPLES

Example 1

Comparison of Sample Irradiation Angle

Figure 13B:
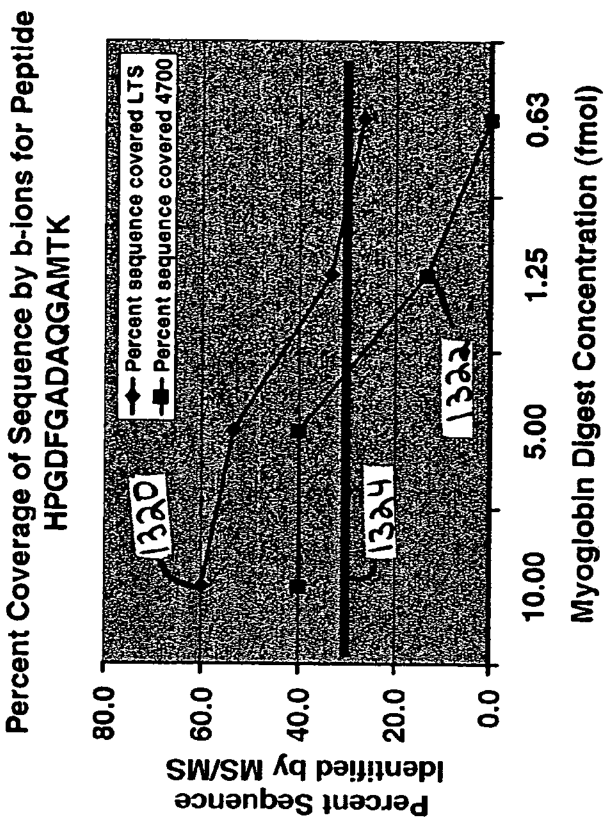
FIGS. 13A and 13B are comparisons of sequence coverage described and discussed in Example 2.
Figure 13A:
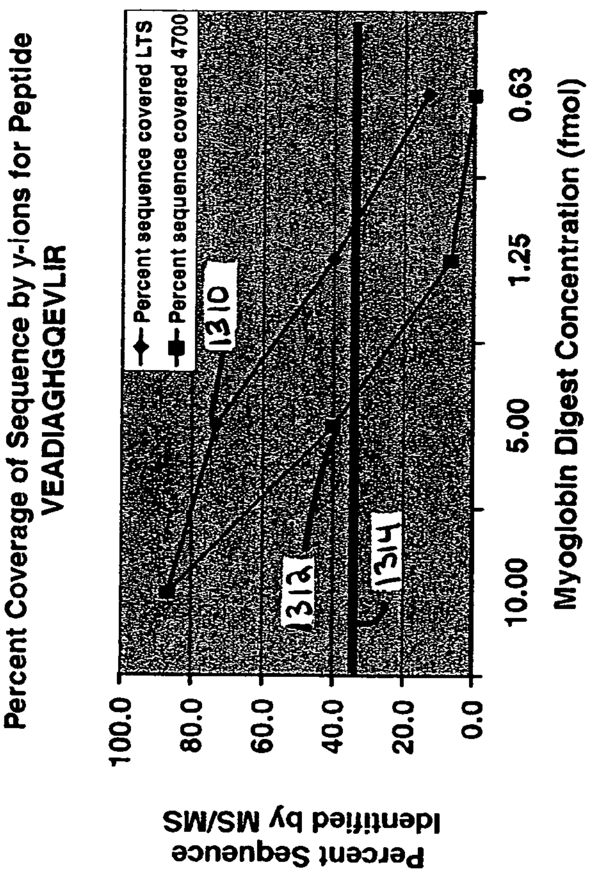

Example 1 compares results obtained with a MALDI mass analyzer system that irradiates samples with a pulse of laser energy at an irradiation angle of about 30 degrees with respect to the normal of the sample holder surface (hereafter referred to as "the 30 degree incidence approach" and by the abbreviation "4700" in FIGS. 13A and 13B) and a MALDI mass analyzer system that irradiates samples with a pulse of laser energy at an irradiation angle within 1 degree of the normal to the sample surface (hereafter referred to as "the normal incidence approach" and by the abbreviation "LTS" in FIGS. 13A and 13B).

The results for the 30 degree incidence approach were obtained with an Applied Biosystems® 4700 Proteomics Analyzer which comprises a tandem TOF mass spectrometer. The results for the normal incidence approach were obtained with a Applied Biosystems 4700 Proteomics Analyzer (manufactured by Applied Biosystems, 850 Lincoln Centre Drive, Foster City, Calif. 94404, U.S.A.) that was modified to irradiate the sample with the laser at an irradiation angle within 1 degree of the normal to the sample surface.

The sample in these experiments was adrenocorticotropic hormone 18-39 clip peptide with m/z 2465.2 for MET*" ("ACTH") was combined with a-cyano-4-hydroxy cinnamic acid matrix solution, various amounts of ACTH were used. The ACTH/mati mixture was deposited on a stainless steel target. The pulse of laser energy was provid by a Nd:YAG laser nominally operating at a repetition rate of 200 Hz, providing nominally 2ji J per pulse at 335 nanometers(nm). The TOF analysis was performed in MS/MS mode with parent ACTH ions selected by the first MS and daughter ions of ACTH selected by the second MS.

Figure 12A:
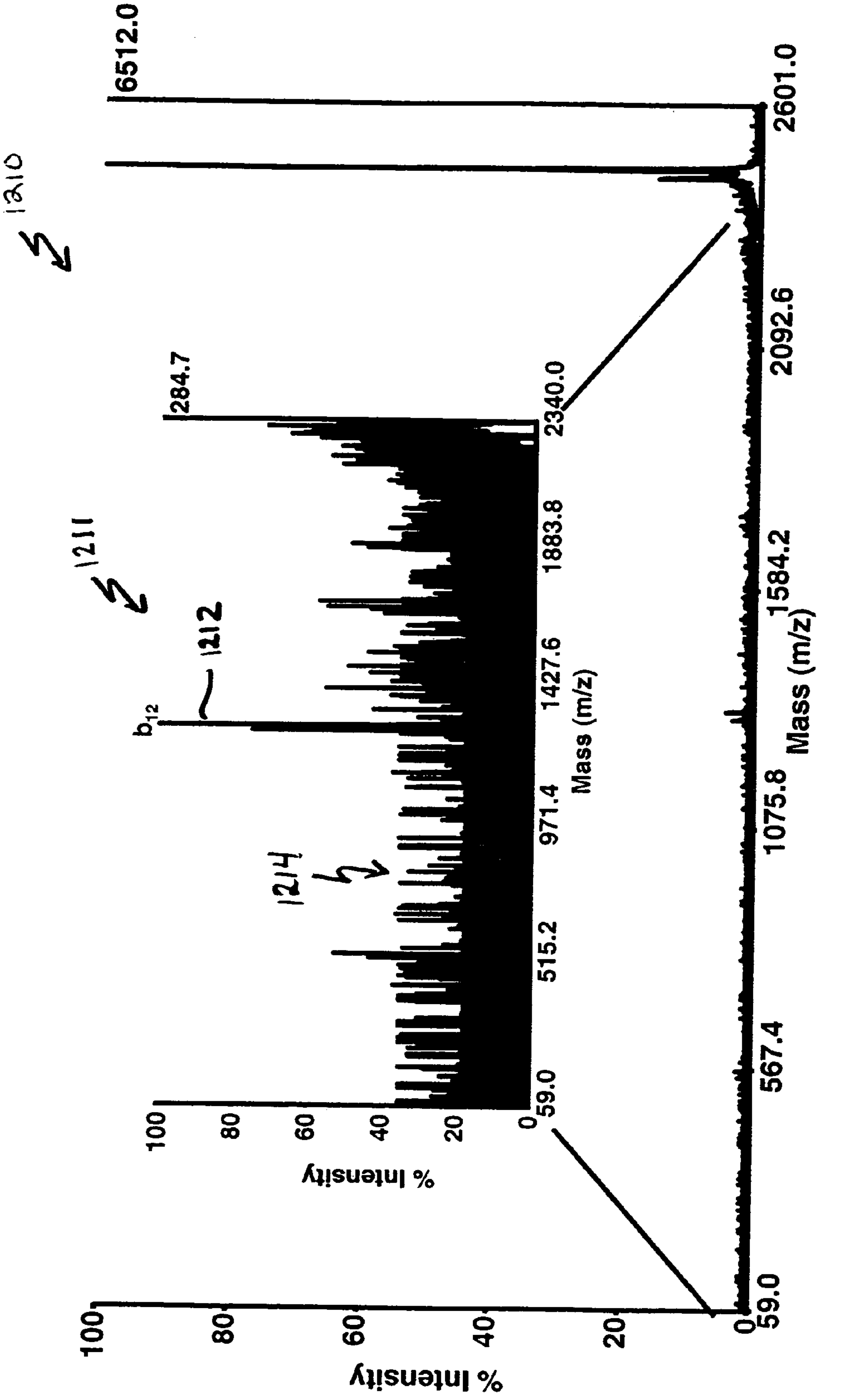
FIGS. 12A–12C are tandem TOF mass spectra of adrenocorticotropic hormone (ACTH) 18–39 clip peptide described and discussed in Example 1.
Figure 12B:
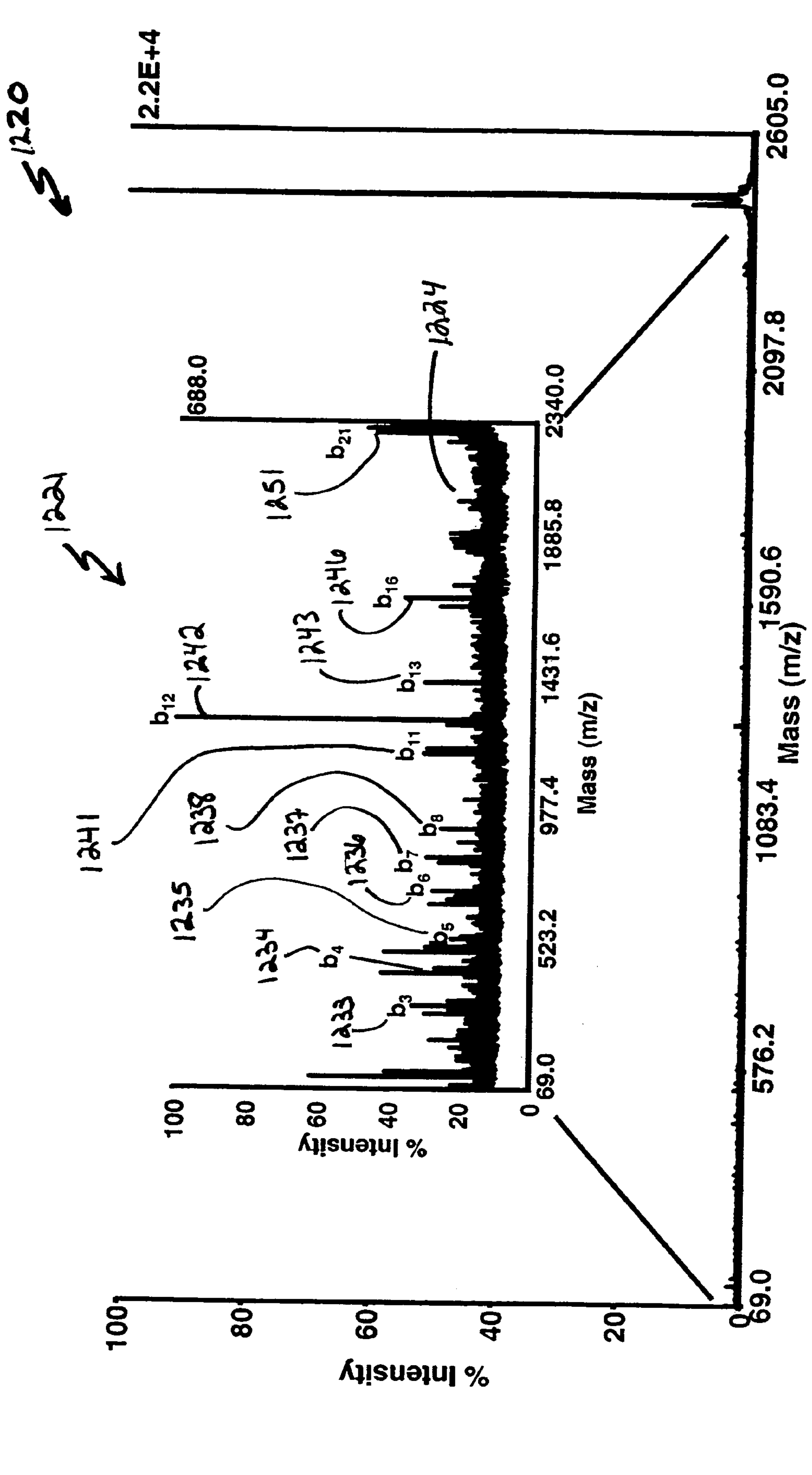
Figure 12C:
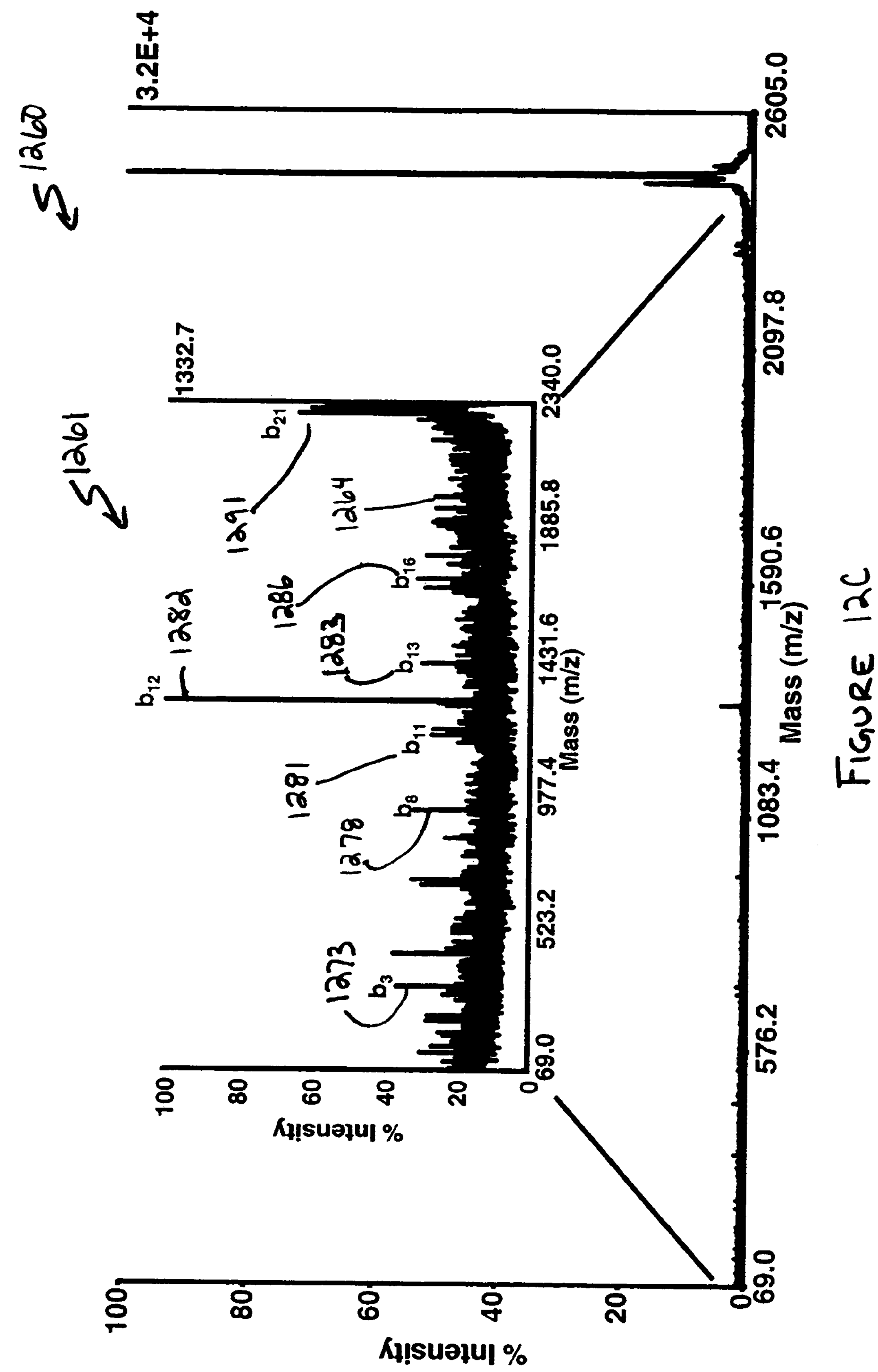

Results are shown in FIGS. 12A, 12B and 12C, where the x-axis is in units of mass to charge ratio (m/z) with mass in atomic mass units (amu), the left y-axis shows relative signal intensity, and the right y-axis shows absolute signal intensity in units of digitizer counts. The digitizer was set to 0.1 volt (V) per division. In both the normal incidence and 30 degree incidence approaches, samples were ionized by MALDI to produce primary sample ions and the sample ions fragmented by CID to produce a series of fragment ions, among which are a ladder of ions with sequentially decreasing numbers of amino acids.

FIG. 12A shows a fragment mass spectrum 1210 for an approximately 5 femtomole (fmol) sample of ACTH obtained by averaging the results for 2000 laser shots for the 30 degree incidence approach. The spectrum of FIG. 12A was obtained with the detector voltage set at approximately 2.1 kV. The inset 1211 is an enlargement of the m/z region 59 to 2340 showing the largest signal detected for the ion fragments of ACTH, was $b_{12}$ fragment ion 1212. Other b-series fragment ions (i.e., the sequence ladder series resulting from amino acid deletions from the N-terminal end) of ACTH are not readily discernable above the noise 1214 in this spectrum.

FIG. 12B shows a fragment mass spectrum 1220 for an approximately 5 fmol sample of ACTH obtained by averaging the results for 2000 laser shots for the normal incidence approach. The sample of ACTH used to obtain FIG. 12B was the same sample used to obtain FIG. 12A. The spectrum of FIG. 12B was obtained with the detector voltage set at approximately 1.8 kV. In the range of 1.8 kV to 2.1 kV the detector gain increase by about a factor of three for each 0.1 kV increase in detector voltage. The inset 1221 is an enlargement of the m/z region 59 to 2340 showing that multiple b-series ion fragments of ACTH are discernable above the noise 1224. For example, in the normal incidence approach the b-series fragments $b_3$ 1233, $b_4$ 1234, $b_5$ 1235, $b_6$ 1236, $b_7$ 1237, $b_8$ 1238, $b_{11}$ 1241, $b_{12}$ 1242, $b_{13}$ 1243, $b_{16}$ 1246, and $b_{21}$ 1251 are discernable above the noise 1224 in this spectrum.

A comparison of FIGS. 12A and 12B shows that the normal incidence approach provided both improved absolute signal intensity and signal-to-noise in comparison to the 30 degree incidence approach. For example, it can be seen that the absolute signal intensity for the $b_{12}$ fragment ion is about a factor of three greater in FIG. 12B than in 12A, and when the difference in detector voltage is factored in, the signal is seen to be increased by a much larger factor. In addition, b-series ion fragments $b_3$–$b_8$, $b_{11}$–$b_{13}$, $b_{16}$ and $b_{21}$, which are not discernable in FIG. 12A are clearly discernable in FIG. 12B.

FIG. 12C shows a fragment mass spectrum 1260 for an approximately 1 fmol sample of ACTH obtained by averaging the results for 2000 laser shots for the normal incidence approach. The spectrum of FIG. 12C was obtained with the detector voltage set at approximately 2.0 kV. The inset 1261 is an enlargement of the m/z region 59 to 2340 showing that multiple b-series ion fragments of ACTH are discernable above the noise 1264. For example, in the normal incidence approach the b-series fragments $b_3$ 1273, $b_8$ 1278, $b_{11}$ 1281, $b_{12}$ 1282, $b_{13}$ 1283, $b_{16}$ 1286, and $b_{21}$ 1291 are discernable above the noise 1264 in this spectrum.

A comparison of FIGS. 12A and 12C shows that the normal incidence approach provided both improved absolute signal intensity and signal-to-noise in comparison to the 30 degree incidence approach even where the amount of ACTH in the normal incidence approach was five times less than used in the 30 degree incidence approach. For example, it can be seen that the absolute signal intensity for the $b_{12}$ fragment ion is about a factor of two greater in FIG. 12C than in 12A. In addition, b-series ion fragments $b_3$, $b_8$, $b_{11}$–$b_{13}$, $b_{16}$ and $b_{21}$, which are not discernable in FIG. 12A are clearly discernable in FIG. 12C.

Example 2

Peptide Identification Comparison

FIGS. 13A and 13B compares the sequence identification ability of the MALDI source and mass analyzer systems used in Example 1 for typical peptides of myoglobin digested by trypsin. FIG. 13A compares the percentage of the peptide sequence VEADIAGHGQEVLIR (Sequence ID No. 1) identified in a MS/MS mass spectra generated by the 30 degree incidence approach and by the normal incidence approach. FIG. 13B compares the percentage the peptide sequence HPGDFGADAQGAMTK (Sequence ID No. 2) identified in a MS/MS mass spectra generated by the 30 degree incidence approach and by the normal incidence approach.

In both the normal incidence and 30 degree incidence approaches, samples were ionized by MALDI to produce primary sample ions and the sample ions fragmented to a series of fragment ions, among which are a ladder of ions with sequentially decreasing numbers of ammo acids. Since the fragmentation can occur anywhere along the peptide, a spectrum of mass-to-charge ratios is generated. Typically, two prominent sets of ions are observed in a fragmentation spectrum. One set is a sequence ladder with amino acid deletions from the C-terminal end of the peptide (often referred to as the b series), while the other set is a sequence ladder with amino acid deletions from the N-terminal end (often referred to as the y series). Complete or partial amino acid sequence information for the parent ions can be obtained by interpretation of the fragmentation spectra and database searching. As the different amino acids within a peptide each have different masses, the fragmentation spectrum of a peptide is usually characteristic of the peptide sequence and can be used to identify the peptide. In addition, peptides can be unique to their parent protein (e.g., as signature peptides) and the identification of a peptide can be used in certain cases to identify the parent protein from which it came.

FIG. 13A shows the percentage coverage by the y-series ions of the peptide VEADIAGHGQEVLIR for various concentrations of myoglobin in the digest, where the y-axis is the percentage coverage and the x-axis is the concentration of myoglobin in the digest in units of fmol. The data for the normal incidence approach is plotted as filled diamonds 1310 and the data for the 30 degree approach is plotted as filled squares 1312. The solid line 1314 is an arbitrary indication of the percentage of sequence identification that may be necessary in a hypothetical database search for peptide identification. FIG. 13A shows that except for the highest myoglobin concentration, that the normal incidence approach can identify a higher percentage of the peptide sequence through the mass spectrum of the y-series ions than the 30 degree approach.

FIG. 13B shows the percentage coverage by the b-series ions of the peptide HPGDFGADAQGAMTK for various concentrations of myoglobin in the digest, where the y-axis is the percentage coverage and the x-axis is the concentration of myoglobin in the digest in units of fmol. The data for the normal incidence approach is plotted as filled diamonds 1320 and the data for the 30 degree approach is plotted as filled squares 1322. The solid line 1324 is an arbitrary indication of the percentage of sequence identification that may be necessary in a hypothetical database search for peptide identification. FIG. 13B shows that the normal incidence approach can identify a higher percentage of the peptide sequence through the mass spectrum of the b-series ions than the 30 degree approach.

The claims should not be read as limited to the described order or elements unless stated to that effect. While the invention has been particularly shown and described with reference to specific illustrative embodiments, it should be understood that various changes in form and detail may be made without departing from the spirit and scope of the invention as defined by the appended claims. By way of example, any of the disclosed features can be combined with any of the other disclosed features to practice a method of MALDI ion formation or produce a MALDI ion source or mass analyzer system in accordance with various embodiments of the invention. For example, any of the various disclosed optical systems, ion optical systems, heater systems, temperature-controlled surface configurations, and mass analyzers can be combined to produce a MALDI ion source or mass analyzer system in accordance with various embodiments of the invention. Therefore, all embodiments that come within the scope and spirit of the following claims and equivalents thereto are claimed.

What is claimed is:

1. An ion source for matrix-assisted laser desorption/ionization comprising:

a sample holder having a sample surface;

an optical system configured to irradiate a sample on the sample surface with a pulse of energy such that the pulse of energy strikes a sample on the sample surface; and a first ion optics system configured to extract sample ions in a first direction substantially normal to the sample surface; wherein the pulse of energy striking the sample is substantially coaxial with the first direction.

2. The ion source of claim 1, wherein the first ion optics system comprises:

a first electrode disposed between the sample holder and a second electrode, the first electrode having an aperture and the second electrode having an aperture; and a first ion optical axis defined by the line between the center of the aperture in the first electrode and the center of the aperture in the second electrode, the first ion optical axis intersecting the sample surface at an angle within 5 degrees of the normal of the sample surface.

3. The ion source of claim 2, wherein the first ion optical axis intersects the sample surface at an angle within 1 degree of the normal of the sample surface.

4. The ion source of claim 2, wherein the first ion optics system further comprises an ion deflector disposed between the first electrode and the second electrode, the ion deflector configured to deflect sample ions in a second direction.

5. The ion source of claim 4, wherein the ion source further comprises a third electrode displaced from the ion deflector in a direction opposite the second electrode, the third electrode positioned to receive sample ions traveling along the second direction.

6. The ion source of claim 5, wherein the third electrode is also positioned such that neutral molecules traveling from the sample holder in the first direction do not substantially collide with the third electrode.

7. The ion source of claim 1, further comprising a second ion optics system displaced from the first ion optics system in a direction opposite the sample holder, the second ion optics system configured to deflect sample ions in a second direction.

8. The ion source of claim 7, wherein the second ion optics system comprises a first ion deflector.

9. The ion source of claim 7, wherein the second ion optics system further comprises a third electrode displaced from the first ion deflector in a direction opposite the first ion optics system.

10. The ion source of claim 7, further comprising a third ion optics system displaced from the second ion optics system in a direction opposite the first ion optics system, the third ion optics system configured to receive sample ions traveling along the second direction and to deflect the sample ions in a third direction.

11. The ion source of claim 10, wherein the third ion optics system comprises a fourth electrode having an aperture, the fourth electrode positioned such that neutral molecules traveling from the sample holder in the first direction do not substantially collide with the fourth electrode.

12. The ion source of claim 11, wherein the third ion optics system further comprises a second ion deflector positioned such that neutral molecules traveling from the sample holder in the first direction do not substantially collide with the second ion deflector.

13. An ion source for matrix-assisted laser desorption/ionization comprising:

a sample holder having a sample surface;

a first electrode disposed between the sample holder and a second electrode, the first electrode having an aperture and the second electrode having an aperture;

an extraction direction defined by the line between the center of the aperture in the first electrode and the center of the aperture in the second electrode; and an optical system configured to irradiate a sample on the sample surface with a pulse of energy having a Poynting vector, the optical system configured such that the Poynting vector is substantially coaxial with the extraction direction.

14. The ion source of claim 13, wherein the Poynting vector intersects the sample surface at an angle in the range between about 5 degrees and 50 degrees with respect to the normal of the sample surface.

* * * * *